United States Patent
Morabad et al.

(10) Patent No.: US 11,656,786 B2
(45) Date of Patent: May 23, 2023

(54) OPERATION METHOD OF STORAGE DEVICE

(71) Applicant: SAMSUNG ELECTRONICS CO., LTD., Suwon-si (KR)

(72) Inventors: Gururaj Morabad, Suwon-si (KR); Shiva Pahwa, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/179,652

(22) Filed: Feb. 19, 2021

(65) Prior Publication Data

US 2022/0004333 A1 Jan. 6, 2022

(30) Foreign Application Priority Data

Jul. 2, 2020 (KR) .................. 10-2020-0081432

(51) Int. Cl.
*G06F 3/00* (2006.01)
*G06F 3/06* (2006.01)

(52) U.S. Cl.
CPC .......... *G06F 3/0655* (2013.01); *G06F 3/0604* (2013.01); *G06F 3/0631* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,738,621 B2 | 5/2014 | Hinrichs | |
| 9,830,079 B2 | 11/2017 | Kanno | |
| 2012/0011340 A1 | 1/2012 | Flynn et al. | |
| 2015/0143070 A1 | 5/2015 | Lee et al. | |
| 2018/0246916 A1 | 8/2018 | Fathalla et al. | |
| 2018/0373461 A1 | 12/2018 | Kanno | |
| 2019/0121543 A1 | 4/2019 | Frolikov | |
| 2019/0146675 A1* | 5/2019 | Subramanian | .......... G06F 3/061 711/170 |
| 2019/0227921 A1 | 7/2019 | Frolikov | |
| 2019/0391928 A1 | 12/2019 | Lin | |

* cited by examiner

*Primary Examiner* — Midys Rojas
(74) *Attorney, Agent, or Firm* — Lee IP Law, P.C.

(57) ABSTRACT

An operation method of a storage device includes, when receiving a write request for a first namespace among a plurality of namespaces logically divided and recognized by an external host device, determining whether an available space of the first namespace is insufficient; when it is determined that the available space of the first namespace is insufficient, allocating a portion of an available space of a second namespace different from the first namespace from among the plurality of namespaces to a temporary space for the first namespace; transmitting information about a lack of the available space of the first namespace and information about the allocation of the temporary space of the second namespace to the external host device; and storing data corresponding to the write request for the first namespace in the temporary space of the second namespace.

20 Claims, 16 Drawing Sheets

OPERATION METHOD OF STORAGE DEVICE

CROSS-REFERENCE TO RELATED APPLICATIONS

Korean Patent Application No. 10-2020-0081432, filed on Jul. 2, 2020, in the Korean Intellectual Property Office, and entitled: "Operation Method of Storage Device," is incorporated by reference herein in its entirety.

BACKGROUND

1. Field

Embodiments relate to a semiconductor memory, and more particularly, relate to an operation method of a storage device.

2. Description of the Related Art

Semiconductor memories are classified into volatile memory devices, which lose data stored therein when a power supply voltage is turned off, such as a static random access memory (SRAM), a dynamic RAM (DRAM), and a synchronous DRAM (SDRAM), and nonvolatile memory devices, which retain data stored therein even when a power supply voltage is turned off, such as a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), and a ferroelectric RAM (FRAM).

SUMMARY

Embodiments are directed to an operation method of a storage device, the method including: when receiving a write request for a first namespace among a plurality of namespaces logically divided and recognized by an external host device, determining whether an available space of the first namespace is insufficient; when it is determined that the available space of the first namespace is insufficient, allocating a portion of an available space of a second namespace different from the first namespace from among the plurality of namespaces to a temporary space for the first namespace; transmitting information about a lack of the available space of the first namespace and information about the allocation of the temporary space of the second namespace to the external host device; and storing data corresponding to the write request for the first namespace in the temporary space of the second namespace.

Example embodiments are also directed to an operation method of a storage device, the method including: when receiving a write request for a first nonvolatile memory set among a plurality of nonvolatile memory sets logically divided and recognized by an external host device, determining whether an available space of the first nonvolatile memory set is insufficient; when it is determined that the available space of the first nonvolatile memory set is insufficient, allocating a portion of an available space of a second nonvolatile memory set different from the first nonvolatile memory set from among the plurality of nonvolatile memory sets to a temporary space for the first nonvolatile memory set; transmitting information about a lack of the available space of the first nonvolatile memory set and information about the allocation of the temporary space of the second nonvolatile memory set to the external host device; and storing data corresponding to the write request for the first nonvolatile memory set in the temporary space of the second nonvolatile memory set.

Example embodiments also relate to an operation method of a storage device, the method including: when receiving a write request for a first namespace among a plurality of namespaces logically divided and recognized by an external host device, determining whether an available space of the first namespace is insufficient; when it is determined that the available space of the first namespace is insufficient, allocating a portion of an available space of a second namespace different from the first namespace from among the plurality of namespaces to a temporary space for the first namespace; and storing data corresponding to the write request for the first namespace in the temporary space of the second namespace. Data stored in the first namespace and data stored in the temporary space of the second namespace may be flushed to a third namespace of an external storage device under control of the external host device.

BRIEF DESCRIPTION OF THE FIGURES

Features will become apparent to those of skill in the art by describing in detail example embodiments with reference to the attached drawings in which.

DETAILED DESCRIPTION

Figure 1:
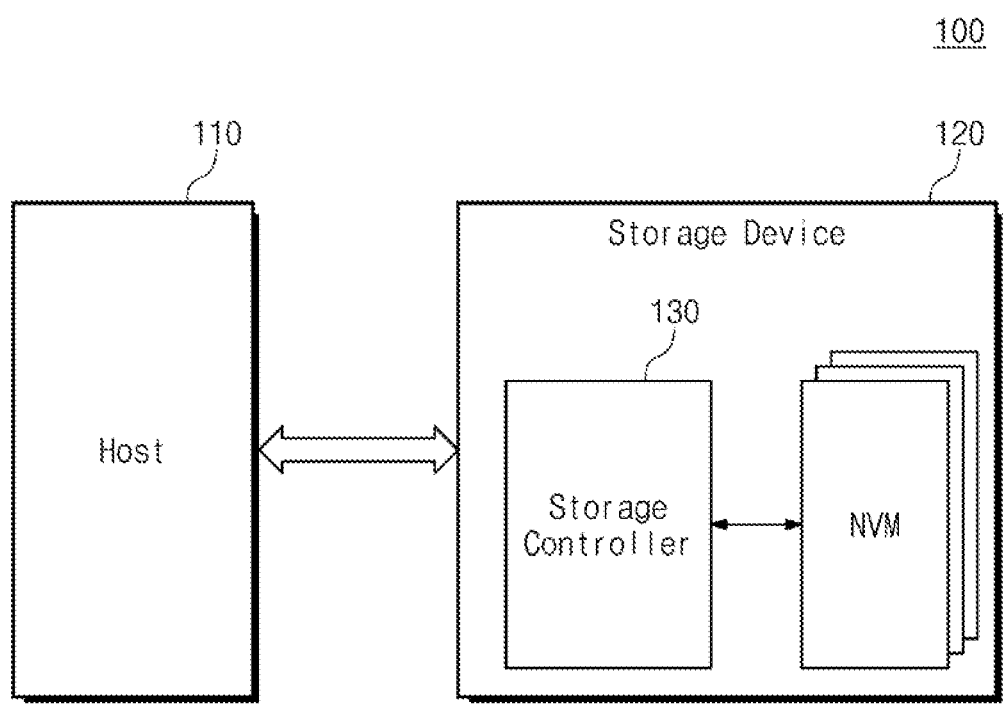
FIG. 1 is a block diagram illustrating a storage system according to an example embodiment.

FIG. 1 is a block diagram illustrating a storage system according to an example embodiment.

Referring to FIG. 1, a storage system 100 may include a host 110 and a storage device 120.

The host 110 may communicate with the storage device 120 through an interface that is determined in advance. For example, through the interface, the host 110 may store data in the storage device 120 or may read data stored in the storage device 120. In an example embodiment, the interface may be a peripheral component interconnect express (PCI-express) interface.

The storage device 120 may include a storage controller 130 and a plurality of nonvolatile memory devices NVM.

The storage controller 130 may communicate with the plurality of nonvolatile memory devices NVM through a plurality of channels.

The storage controller 130 may be configured to process various requests from the host 110. For example, depending on a request of the host 110, the storage controller 130 may store data in at least one of the plurality of nonvolatile memory devices NVM or may read data stored therein. In an example embodiment, the storage controller 130 may be a nonvolatile memory express (NVMe) controller that is based on an NVMe interface.

Under control of the storage controller 130, each of the plurality of nonvolatile memory devices NVM may store data therein or may output data stored therein. In an example embodiment, each of the plurality of nonvolatile memory devices NVM may include a NAND flash memory. For example, each of the plurality of nonvolatile memory devices NVM may include at least one of various memory devices such as a static random access memory (SRAM), a dynamic RAM (DRAM), a synchronous DRAM (SDRAM), a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), and a ferroelectric RAM (FRAM).

In an example embodiment, the host 110 may manage a storage area of the storage device 120 as a logical area. For example, the host 110 may recognize a storage space of the storage device 120 as namespaces that are logically divided. A namespace may be a set of logical blocks. A namespace ID (NSID) is an identifier that is used at the storage device 120 for the host 110 to access a namespace.

In an example embodiment, the host 110 may manage the storage area of the storage device 120 as a physical area. For example, the host 110 may recognize a storage space of the storage device 120 as nonvolatile memory (NVM) sets that are divided logically and physically as much as possible. A first nonvolatile memory set may be a set of nonvolatile memory devices or namespaces that are logically and/or physically separated from nonvolatile memory devices or namespaces included in a second nonvolatile memory set. The nonvolatile memory sets may include different nonvolatile memory devices. A nonvolatile memory set may include one or more namespaces and an unallocated storage area. One namespace may be completely included in one nonvolatile memory set. For example, one namespace may not be distributed into two or more nonvolatile memory sets.

In an example embodiment, in the case where a conventional storage system receives data, the capacity of which exceeds a namespace capacity, the conventional storage system processes the received data as a fail. In contrast, according to an example embodiment, the storage device 120 including a plurality of namespaces may allocate a temporary space of a free spare namespace "B" to a namespace "A", an available space (or an available storage capacity) of which is insufficient. As such, in the case where the storage device 120 receives data, the size of which exceeds an available space of the namespace "A", the storage device 120 may secure the reliability and continuity of data corresponding to a write request by storing the data in a temporary space of the namespace "B". A configuration and an effect according to an example embodiment will be more fully described with reference to drawings below.

Figure 2:
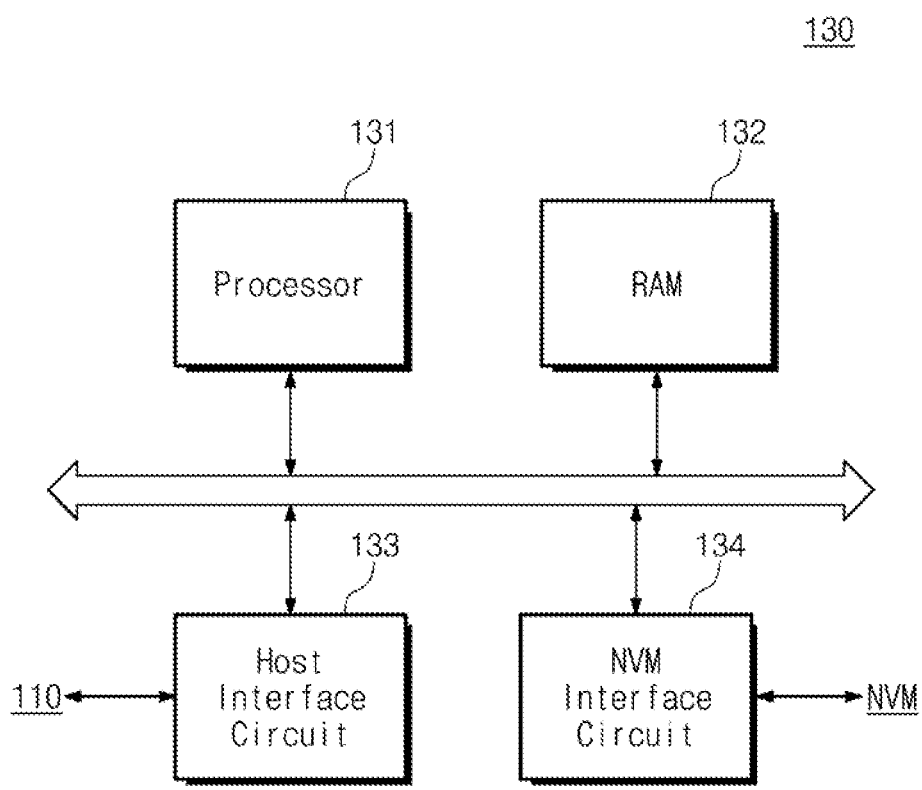
FIG. 2 is a block diagram illustrating a storage controller of FIG. 1.

FIG. 2 is a block diagram illustrating the storage controller 130 of FIG. 1.

Referring to FIGS. 1 and 2, the storage controller 130 may include a processor 131, a random access memory (RAM) 132, a host interface circuit 133, and an NVM interface circuit 134.

The processor 131 may control overall operations of the storage controller 130. The RAM 132 may store a variety of information needed for the storage controller 130 to operate. The RAM 132 may be, for example, a buffer memory, a cache memory, or a dynamic memory of the storage controller 130.

The storage controller 130 may communicate with the host 110 through the host interface circuit 133. As described above, the host interface circuit 133 may be a PCIe interface. In another example embodiment, the host interface circuit 133 may be at least one of various communication interfaces such as a universal serial bus (USB) interface, a multimedia card (MMC) interface, an embedded MMC (eMMC) interface, an advanced technology attachment (ATA) interface, a serial-ATA interface, a parallel-ATA interface, a small computer small interface (SCSI), an enhanced small disk interface (ESDI), an integrated drive electronics (IDE) interface, a Firewire interface, and a universal flash storage (UFS) interface.

The storage controller 130 may communicate with the plurality of nonvolatile memory devices NVM through the NVM interface circuit 134. In an example embodiment, the NVM interface circuit 134 may provide a plurality of channels that are physically divided.

Figure 3:
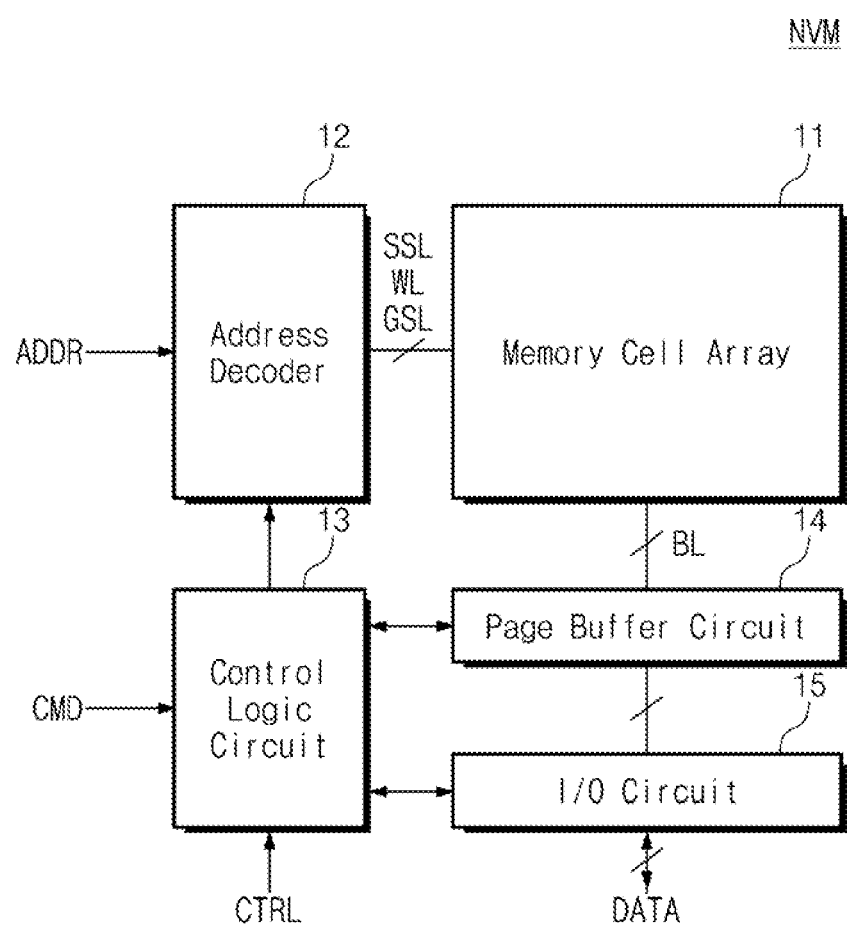
FIG. 3 is a block diagram illustrating one of a plurality of nonvolatile memory devices of FIG. 1.

FIG. 3 is a block diagram illustrating one of a plurality of nonvolatile memory devices of FIG. 1.

Referring to FIGS. 1 and 3, a nonvolatile memory device NVM may include a memory cell array 11, an address decoder 12, a control logic circuit 13, a page buffer circuit 14, and an input/output circuit 15.

The memory cell array 11 may include a plurality of memory blocks. Each of the plurality of memory blocks may include a plurality of cell strings connected with bit lines BL. Each of the plurality of cell strings may include a plurality of memory cells connected with word lines WL.

The address decoder 12 may be connected with the memory cell array 11 through string selection lines SSL, the word lines WL, and ground selection lines GSL. The address decoder 12 may decode an address ADDR received from the storage controller 130 and may control voltages of the word lines WL, based on the decoded address.

The control logic circuit 13 may receive a command CMD and a control signal CTRL from the storage controller 130 and may control the address decoder 12, the page buffer circuit 14, and the input/output circuit 15 based on the received signals.

The page buffer circuit 14 may be connected with the memory cell array 11 through the bit lines BL. The page buffer circuit 14 may temporarily store data read from the memory cell array 11 or data to be stored in the memory cell array 11.

The input/output circuit 15 may provide data "DATA" received from the storage controller 130 to the page buffer circuit 14 or may output the data "DATA" received from the page buffer circuit 14 to the storage controller 130.

In an example embodiment, one nonvolatile memory device NVM is described with reference to FIG. 3. In an example embodiment, various signals (e.g., the address ADDR, the command CMD, the control signal CTRL, and the data "DATA") may be exchanged between the storage controller 130 and the plurality of nonvolatile memory devices NVM through a relevant channel of the plurality of channels.

FIGS. 4A to 4E are block diagrams illustrating various topologies of a storage system according to example embodiments.

Various topologies in which the host 110 is capable of recognizing a plurality of namespaces will be described with reference to FIGS. 4A to 4E. For brevity of illustration and convenience of description, similar components are marked by similar reference numerals in FIGS. 4A to 4E. Also, to describe the technical idea of the inventive concept clearly, it is assumed that the host 110 and the storage controller 130 are connected through a PCIe port and communicate with each other based on the NVMe interface.

Figure 4A:
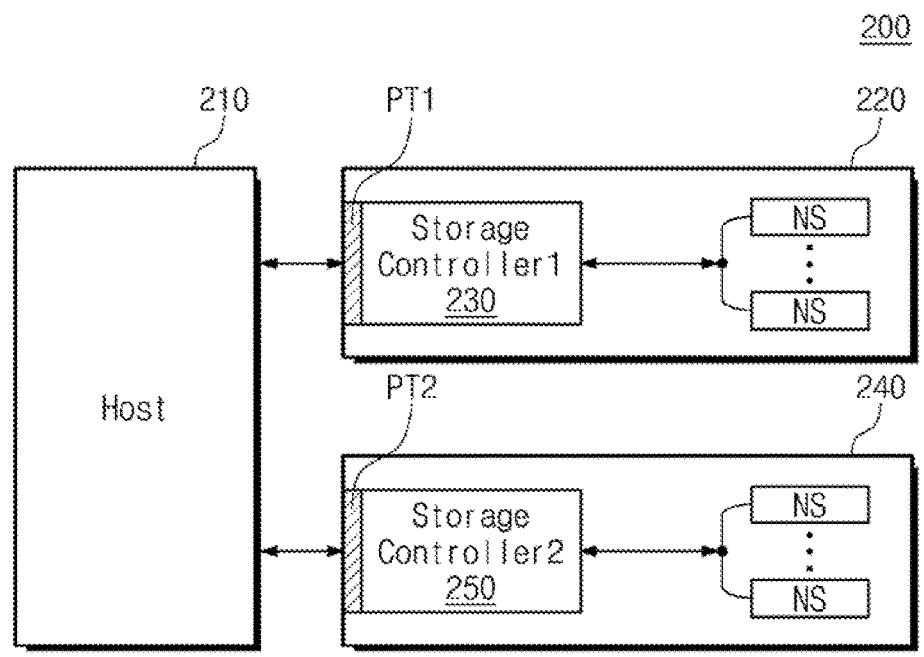
FIGS. 4A to 4E are block diagrams illustrating various topologies of a storage system according to example embodiments.

Referring to FIG. 4A, a storage system 200 may include a host 210, and first and second storage devices 220 and 240. The host 210 may communicate with a first storage controller 230 of the first storage device 220 through a first port PT1, and may communicate with a second storage controller 250 of the second storage device 240 through a second port PT2. The first and second storage devices 220 and 240 may be implemented with different storage devices.

As described above, the host 210 may logically distinguish storage areas of the first and second storage devices 220 and 240, and may recognize the storage area of each of the first and second storage devices 220 and 240 as a plurality of namespaces NS. The host 210 may control the logically divided namespaces NS independently of each other.

Figure 4B:
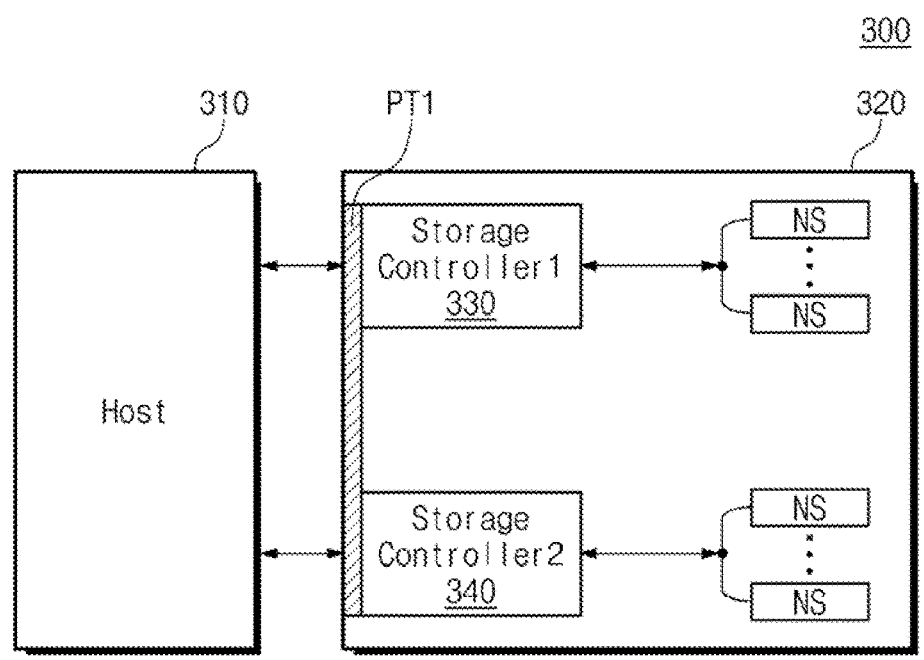

Referring to FIG. 4B, a storage system 300 may include a host 310 and a storage device 320. The host 310 may communicate with the storage device 320 through a first port PT1. The storage device 320 may include first and second storage controllers 330 and 340 that are physically separated from each other. The first and second storage controllers 330 and 340 may be controllers that are included in the storage device 320 and are physically separated from each other, and may communicate with the host 310 through the first port PT1. In an example embodiment, each of the first and second storage controllers 330 and 340 may be an NVMe controller.

As described above, the host 310 may logically distinguish storage areas of the storage device 320 and may recognize each storage area of the storage device 320 as a plurality of namespaces NS. The host 310 may control the logically divided namespaces NS independently of each other.

Figure 4C:
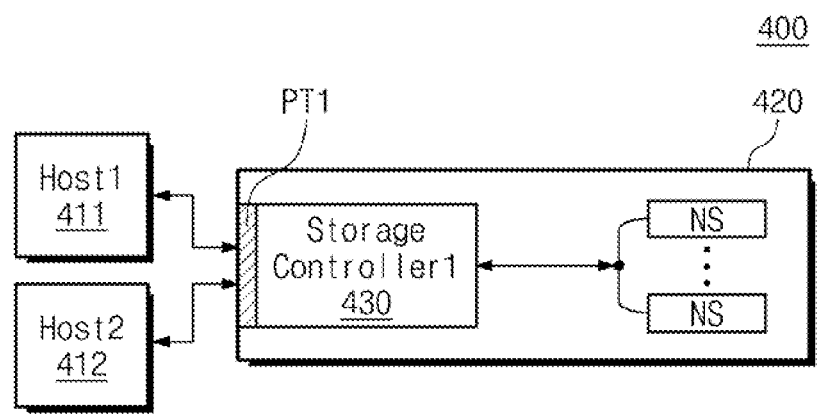

Referring to FIG. 4C, a storage system 400 may include first and second hosts 411 and 412, and a storage device 420. The first and second hosts 411 and 412 may communicate with a storage controller 430 of the storage device 420 through a first port PT1.

The first and second hosts 411 and 412 may recognize a storage space of the storage device 420 as a plurality of namespaces NS. Namespaces NS recognized by the first host 411 may be different from namespaces NS recognized by the second host 412. In an example embodiment, the first and second hosts 411 and 412 may be different cores or different processors.

Figure 4D:
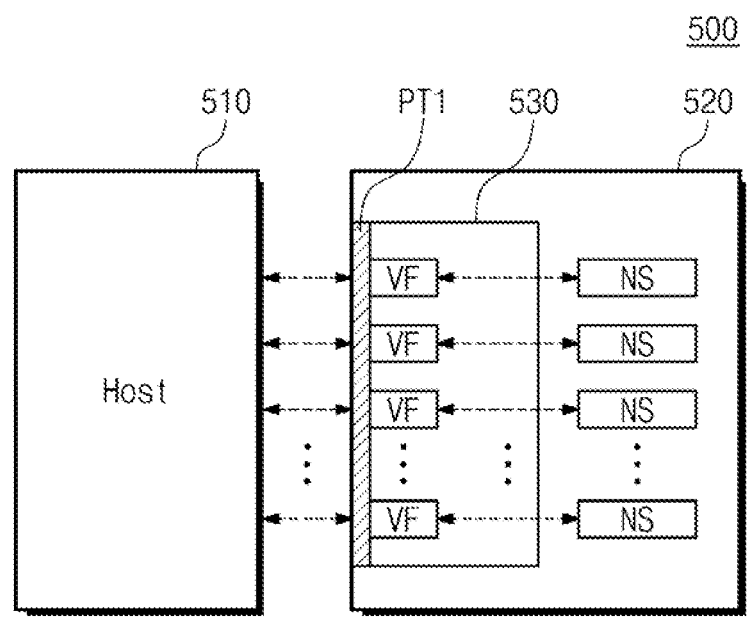

Referring to FIG. 4D, a storage system 500 may include a host 510 and a storage device 520. The host 510 may communicate with a storage controller 530 of the storage device 520 through a first port PT1. The storage controller 530 of the storage device 520 may include a plurality of virtual functions VF. Each of the plurality of virtual functions VF may provide a function of processing a command or an I/O from the host 510 independently. The host 510 may recognize a plurality of namespaces NS through the plurality of virtual functions VF. In an example embodiment, the plurality of virtual functions VF may be implemented through a Single Root I/O Virtualization (SR-MY) of the NVMe interface.

Figure 4E:
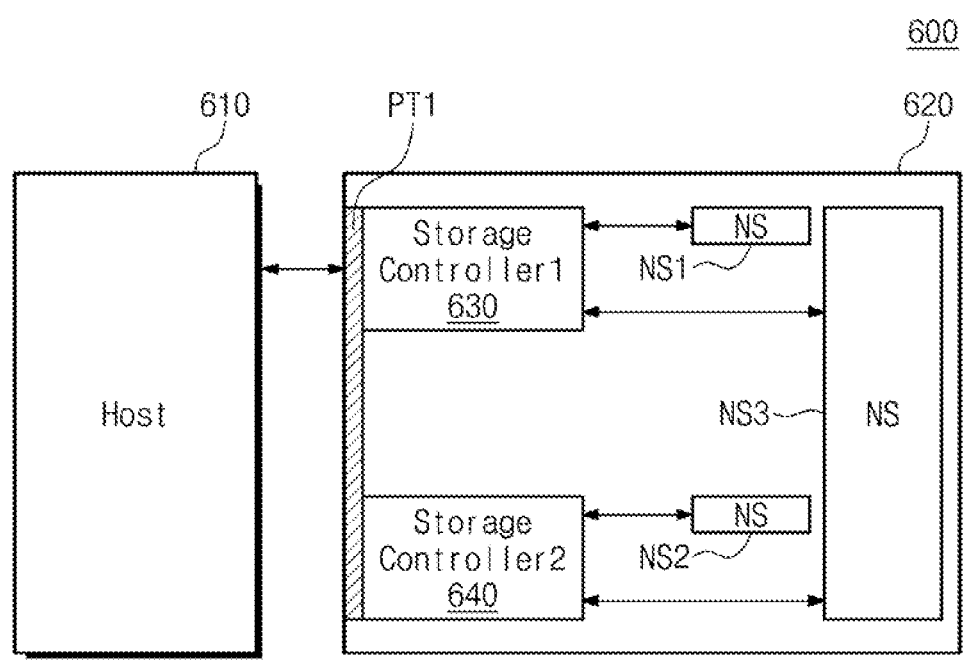

Referring to FIG. 4E, a storage system 600 may include a host 610 and a storage device 620. The host 610 may communicate with the storage device 620 through a first port PT1. The storage device 620 may include first and second storage controllers 630 and 640 that are physically separated from each other. The first and second storage controllers 630 and 640 may be controllers that are included in the storage device 620 and are physically separated from each other, and may communicate with the host 610 through the first port PT1. In an example embodiment, each of the first and second storage controllers 630 and 640 may be an NVMe controller.

As described above, the host 610 may logically distinguish storage areas of the storage device 620, and may recognize each storage area of the storage device 620 as a plurality of namespaces NS. The host 610 may control logically divided namespaces NS1 to NS3 independently of each other. The first storage controller 630 may control the first and third namespaces NS1 and NS3, and the second storage controller 640 may control the second and third namespaces NS2 and NS3. Thus, the third namespace NS3 may be a namespace that is shared by the plurality of storage controllers 630 and 640.

As described above, at least one host may be configured to recognize a storage area of at least one storage device as a plurality of namespaces NS and to control the plurality of namespaces NS independently of each other. Various topologies of a storage system capable of distinguishing namespaces are described with reference to FIGS. 4A to 4E. The embodiments of FIGS. 4A to 4E may be variously combined. A storage system capable of distinguishing namespaces NS may be variously implemented different from that illustrated in the example embodiments of FIGS. 4A to 4E.

Various topologies of a storage system capable of distinguishing namespaces according to example embodiments are described with reference to FIGS. 4A to 4E. However, various topologies of a storage system may be described under the condition that namespaces are replaced with nonvolatile memory sets.

Below, for convenience of description, example embodiments will be described with reference to the storage system 100 illustrated in FIG. 1. Example embodiments may be implemented through, for example, the storage systems 200 to 600 described with reference to FIGS. 4A to 4E, or through a storage system similar thereto.

Figure 5:
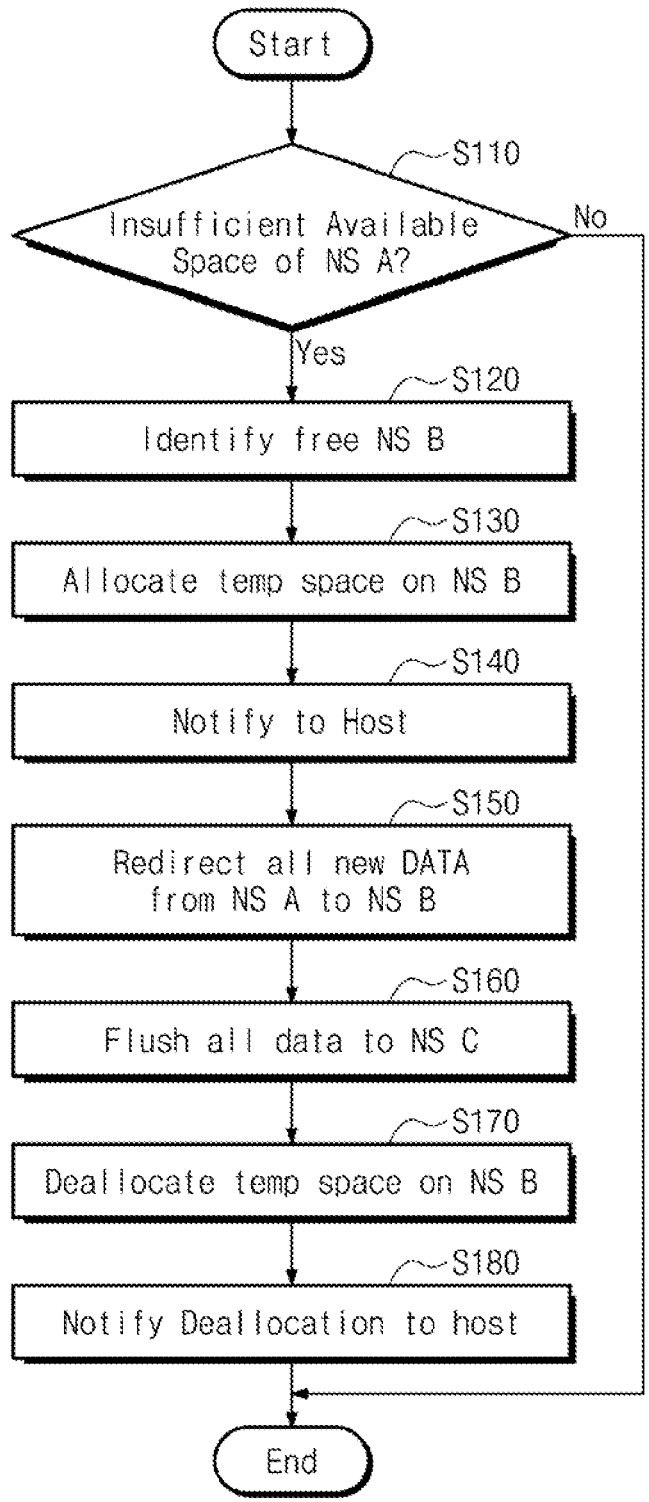
FIG. 5 is a flowchart illustrating an operation method of a storage device of FIG. 1.

FIG. 5 is a flowchart illustrating an operation method of a storage device of FIG. 1.

A method in which the storage device 120 processes data in run-time without a data loss when the host 110 receives data larger in size than an available space of an A namespace NS A will be described with reference to FIG. 5.

Referring to FIGS. 1 and 5, in operation S110, the storage device 120 may determine whether an available space of the A namespace NS A is insufficient. For example, in the case where the storage device 120 receives a write request for the A namespace NS A, the storage device 120 may determine whether a space capable of storing additional data in the A namespace NS A, that is, an available space, is insufficient. In an example embodiment, the storage device 120 may determine whether a size of data corresponding to the write request exceeds an available space of the A namespace NS A. In another implementation, the storage device 120 may determine whether an available space of the A namespace NS A is equal to or less than a given reference size.

In an example embodiment, in the case where the storage controller 130 is an NVMe controller based on the NVMe interface, the write request may include a command ID, an OP code, a namespace ID (NSID), a data pointer, a start logical address, the number of logical blocks, etc. The OP code may be information indicating a kind of a command to be requested. The namespace ID (NSID) may be an identifier that is used at the storage device 120 for the host 110 to access a namespace. The data pointer may be information indicating a host memory address at which data corresponding to the write request are stored. In another implementation, the data pointer may be information indicating a host memory address at which there is stored a list (PRP or SGL) including host memory addresses where the data corresponding to the write request are stored. The number of logical blocks may be information indicating a size of the data corresponding to the write request.

When it is determined that the available space of the A namespace NS A of the storage device 120 is not insufficient (e.g., is sufficient), a separate temporary space may not be allocated. When it is determined that the available space of the A namespace NS A of the storage device 120 is insufficient, in operation S120, the storage device 120 may identify a free B namespace NS B. For example, when a space of the A namespace NS A is insufficient to store the data corresponding to the write request, a separate storage space or a temporary space for temporarily storing the data to be stored in the A namespace NS A may be called for. Thus, the storage device 120 may identify the free B namespace NS B.

In an example embodiment, the free B namespace NS B may be a namespace having a lowest usage rate from among a plurality of namespaces. In another implementation, the free B namespace NS B may be a namespace having a smallest data traffic from among a plurality of namespaces.

In operation S130, the storage device 120 may allocate a portion of an available space of the B namespace NS B to a temporary space. For example, to store data associated with the A namespace NS A, the storage device 120 may provide a portion of an available space of the B namespace NS B as a temporary space. Thus, the storage device 120 may provide a portion of a space of the B namespace NS B, in which data are not stored, as a temporary space.

In an example embodiment, after the storage device 120 allocates the temporary space by using an available space of the B namespace NS B, the storage device 120 may fail to store data corresponding to a write request for the B namespace NS B in the temporary space of the B namespace NS B. Because the host 110 predicts that data of the A namespace NS A are to be stored in the temporary space of the B namespace NS B through operation S140 to be described blow, the host 110 may not request the storage device 120 to write data in the temporary space of the B namespace NS B.

In an example embodiment, in the case where the storage device 120 receives a write request with regard to an area of the B namespace NS B, which is not allocated to the temporary space, the storage device 120 may store data in the unallocated area of the B namespace NS B.

After a new storage device is added and a data flush (to be performed in operation S160 to be described below) is completed, the storage device 120 may deallocate the allocated temporary space of the B namespace NS B and may store data corresponding to a write request for the B namespace NS B.

In operation S140, the storage device 120 may notify the host 110 of information. For example, the storage device 120 may notify the host 110 of information through an asynchronous event request. The information that is notified to the host 110 may include information about lack of an available space of the A namespace NS A and information about allocation of a temporary space of the B namespace NS B. The information about lack of an available space of the A namespace NS A may be information indicating that the available space of the A namespace NS A is insufficient. The information about allocation of a temporary space of the B namespace NS B may be information indicating that a free namespace is the B namespace NS B and data of the A namespace NS A to be received later are capable of being stored in the temporary space of the B namespace NS B. An example of how to transfer information will be more fully described with reference to FIG. 8.

In operation S150, the storage device 120 may store data received with respect to the A namespace NS A in the temporary space of the B namespace NS B. For example, in the case where the storage device 120 receives an additional data write request for the A namespace NS A from the host 110, the storage device 120 may store data corresponding to a write request in the temporary space of the B namespace NS B, not the A namespace NS A.

In the case where a temporary space is not allocated and an available space of the A namespace NS A is sufficient, the storage device 120 may receive a write request, in which a namespace ID of the A namespace NS A is included, from the host 110. In response to the write request in which the namespace ID of the A namespace NS A is included, the storage device 120 may store data corresponding to the write request in the A namespace NS A.

In the case where a temporary space is not allocated and an available space of the A namespace NS A is insufficient, the storage device 120 may receive the write request, in which the namespace ID of the A namespace NS A is included, from the host 110. In response to the write request in which the namespace ID of the A namespace NS A is included, the storage device 120 may fail to store data corresponding to the write request in the A namespace NS A. Instead, the storage device 120 may transmit a write completion including a status code indicating an "LBA out of range" or a "capacity exceeded" to the host 110.

In the case where a temporary space is allocated and an available space of the A namespace NS A is insufficient, the storage device 120 may store data corresponding to a write request in the temporary space of the B namespace NS B. In an example embodiment, the host 110 may transmit a write request including a namespace ID of the B namespace NS B to the storage device 120. The write request may further include information indicating that the write request is a request for the A namespace NS A in fact. In response to the write request including the namespace ID of the B namespace NS B, the storage device 120 may store data corresponding to the write request in the temporary space of the B namespace NS B.

In another example embodiment, the host 110 may transmit a write request including the namespace ID of the A namespace NS A to the storage device 120. In response to the write request including the namespace ID of the A namespace NS A, the storage device 120 may automatically store data corresponding to the write request in the temporary space of the B namespace NS B.

Until the temporary space is deallocated, (1) the data associated with the A namespace NS A may be stored in the temporary space of the B namespace NS B; (2) the data associated with the B namespace NS B may fail to be stored in the temporary space of the B namespace NS B; and (3) an available space in which the data associated with the B namespace NS B is capable of being stored may be temporarily reduced. The host 110 may predict (1), (2), and (3) described above through operation S140.

In operation S160, under control of the host 110, data may be flushed to a C namespace NS C. For example, another storage device may be added to the storage system 100, and the C namespace NS C may be generated. Under control of the host 110, the storage device 120 may read all data stored in the A namespace NS A and the B namespace NS B, and may store the read data in the C namespace NS C.

When all the data of the A namespace NS A is completely flushed to the C namespace NS C, the A namespace NS A may be replaced with the C namespace NS C. For example, when a write request for the A namespace NS A is received, data corresponding to the write request may be stored in the C namespace NS C.

When the flush operation is completed, the storage device 120 may deallocate the temporary space of the B namespace NS B. For example, the storage device 120 may delete data being stored in the temporary space of the B namespace NS B, and may set the B namespace NS B to a state capable of storing new data in the temporary space of the B namespace NS B. Thus, when a write request for the B namespace NS B is additionally received, the storage device 120 may store data corresponding to the write request in the temporary space of the B namespace NS B (i.e., in a space of the B namespace NS B, which corresponds to the deallocated temporary space).

The storage device 120 may notify the host 110 that the temporary space of the B namespace NS B is completely deallocated. Thus, the storage device 120 may transmit information about deallocation of a temporary space to the host 110. In an example embodiment, in the case where the host 110 transmits an asynchronous event request command to the storage device 120 in advance, the storage device 120 may transmit, to the host 110, an asynchronous event request completion in which the information about deallocation of a temporary space is included.

In another example embodiment, the storage device 120 may update a log by using the information about deallocation of a temporary space. The storage device 120 may transmit the asynchronous event request completion to the host 110. The host 110 may transmit a "Get Log Page" command to the storage device 120. The storage device 120 may transmit, to the host 110, log data in which the information about deallocation of a temporary space is included and a "Get Log Page" completion.

A user application of the host 110 may fail to predict how much traffic of data is to be received later. For this reason, in the case where the user application receives data, the size of which exceeds available space of the A namespace NS A allocated in advance, a data loss may occur. According to an example embodiment, the storage device 120 may store data in a temporary space of the free B namespace NS B in run-time, thus securing continuity and reliability of received data.

Figure 6A:
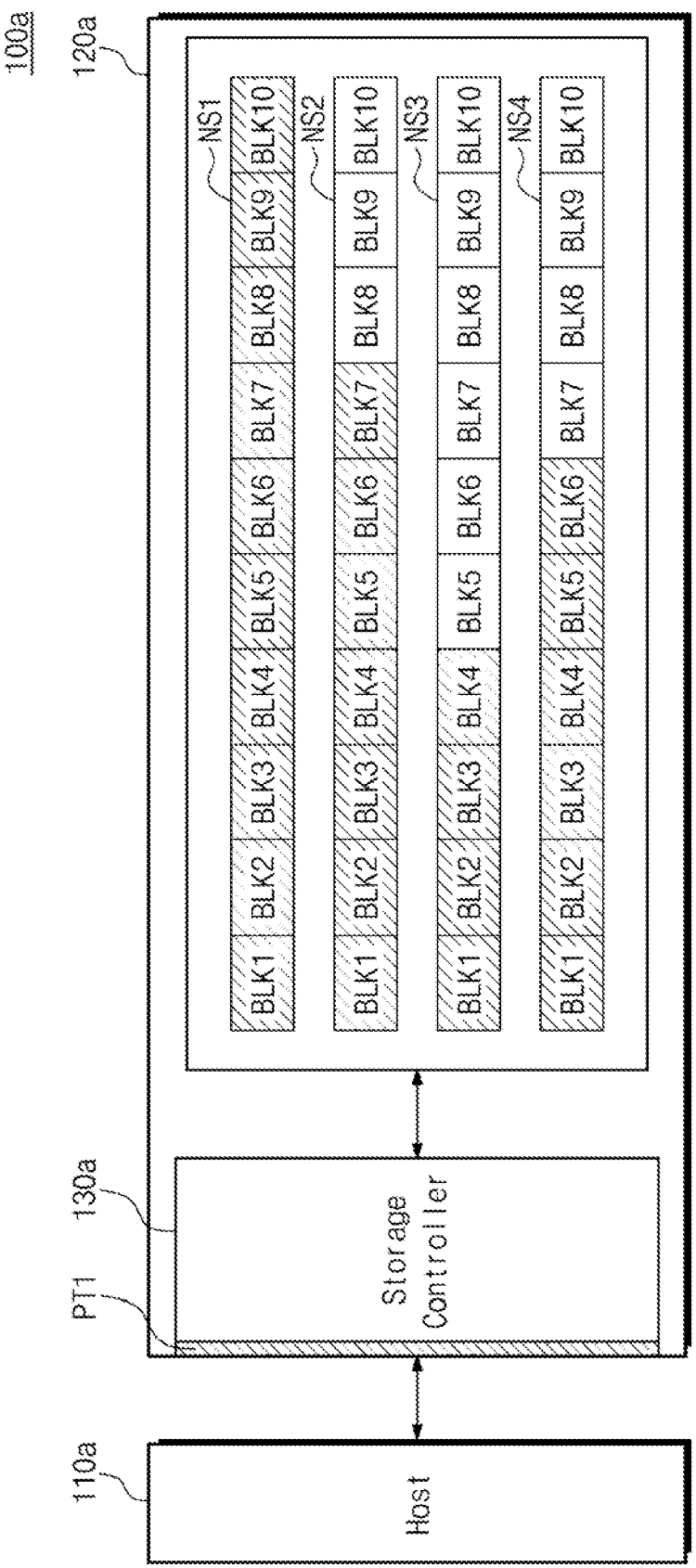
FIGS. 6A to 6C are diagrams illustrating an operation method of a storage device of FIG. 1.
Figure 6B:
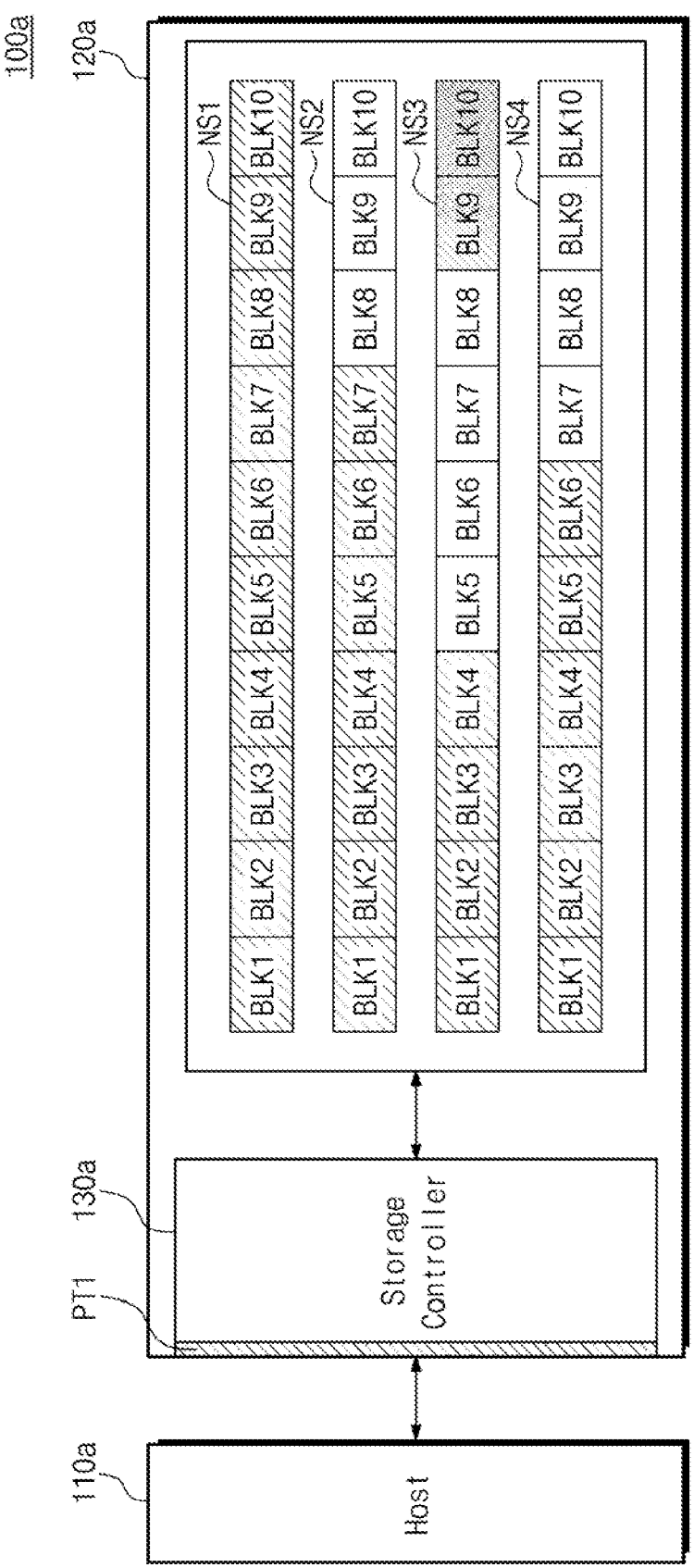
Figure 6C:
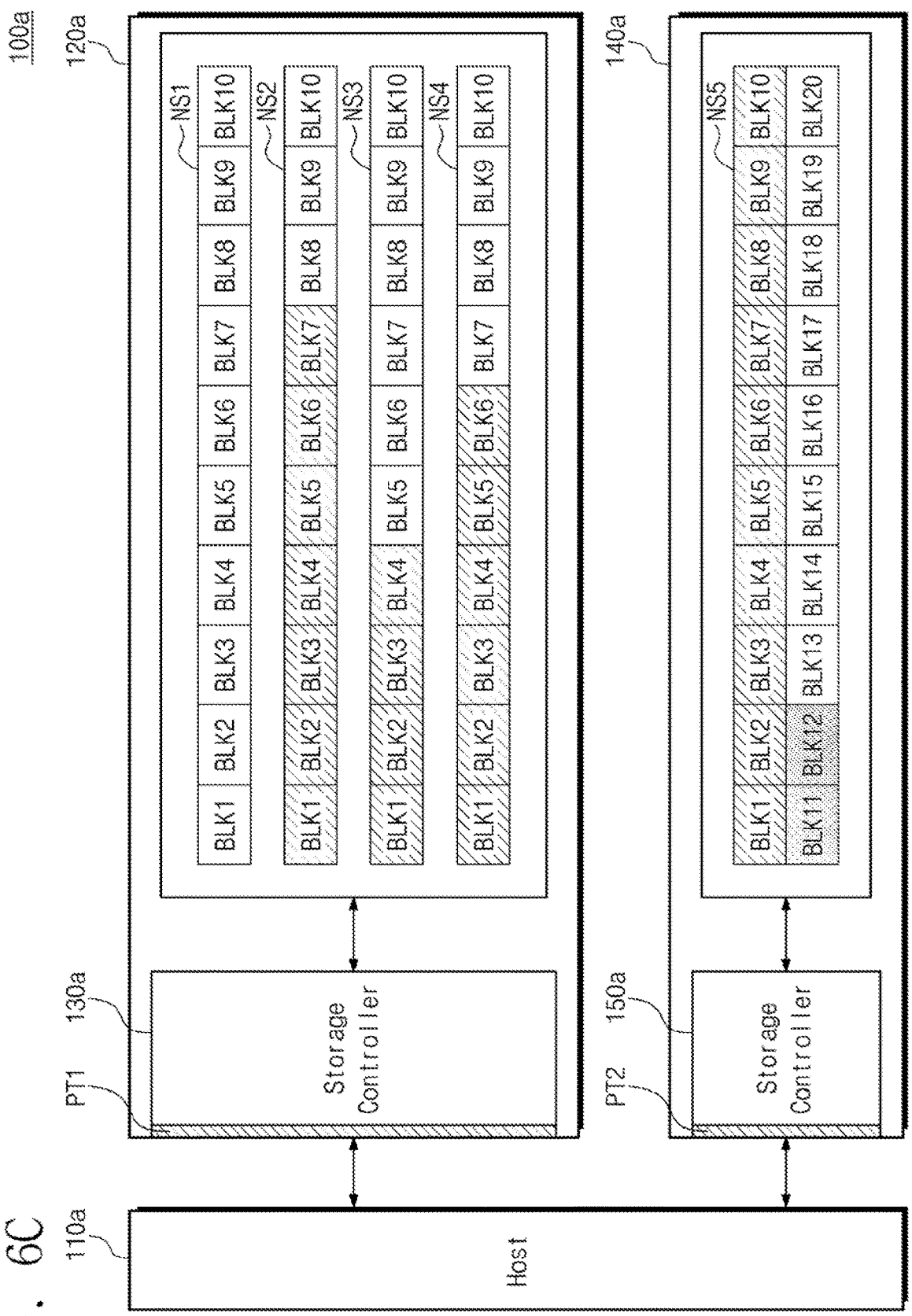

FIGS. 6A to 6C are diagrams illustrating an operation method of the storage device 120 of FIG. 1. For brevity of illustration, components that are unnecessary to describe an operation of the storage device 120 will be omitted.

Referring to FIGS. 5 and 6A, a storage system 100a may include a host 110a and a first storage device 120a. The host 110a may communicate with the first storage device 120a through a first port PT1. The first storage device 120a may include a storage controller 130a. In an example embodiment, the storage controller 130a may be an NVMe controller.

The host 110a may logically divide a storage area of the storage device 120 into first to fourth namespaces NS1 to NS4, and may recognize the first to fourth namespaces NS1 to NS4. The host 110a may control the logically divided namespaces NS1 to NS4 independently of each other. In an example embodiment, the number of namespaces and a size of a namespace may be variously set according to an implementation of the host 110a or the first storage device 120a.

Each of the plurality of namespaces NS1 to NS4 may include first to tenth blocks BLK1 to BLK10. A block may mean a logical block. In various example embodiments, the number of blocks included in a namespace may be variously determined, and the number of blocks included in each of namespaces may not be the same.

Data may be stored in the first to tenth blocks BLK1 to BLK10 of the first namespace NS1. Data may be stored in the first to seventh blocks BLK1 to BLK7 of the second namespace NS2. Data may be stored in the first to fourth blocks BLK1 to BLK4 of the third namespace NS3. Data may be stored in the first to sixth blocks BLK1 to BLK6 of the fourth namespace NS4.

In case where the first storage device 120a receives a write request for the first namespace NS1, the first storage device 120a may determine whether an available space of the first namespace NS1 is insufficient. Because data are stored in all the blocks BLK1 to BLK10 of the first namespace NS1, the first storage device 120a may determine that an available space of the first namespace NS1 is equal to or less than a given reference size. In another implementation, the first storage device 120a may determine that a size of data corresponding to the write request for the first namespace NS1 exceeds an available space of the first namespace NS1. As a result, the first storage device 120a may determine that the available space of the first namespace NS1 is insufficient.

To store data additionally received with respect to the first namespace NS1, the first storage device 120a may identify a free namespace. For example, the first storage device 120a may select a namespace having the lowest usage rate from among the plurality of namespaces NS2 to NS4. Because data are stored in the first to seventh blocks BLK1 to BLK7 of the second namespace NS2, the usage rate of the second namespace NS2 may be 70%. Because data are stored in the first to fourth blocks BLK1 to BLK4 of the third namespace NS3, the usage rate of the third namespace NS3 may be 40%. Because data are stored in the first to sixth blocks BLK1 to BLK6 of the fourth namespace NS4, the usage rate of the fourth namespace NS4 may be 60%. The first storage device 120a may identify the third namespace NS3 having the lowest usage rate as a free namespace.

The first storage device 120a may allocate a portion of the third namespace NS3, that is, the ninth and tenth blocks BLK9 and BLK10 to a temporary space for the first namespace NS1. For example, under assumption that data associated with the first namespace NS1 are to be additionally received, the first storage device 120a may prepare a temporary space capable of storing the data to be additionally received. The first storage device 120a may provide a portion of an available space of the third namespace NS3 being a free namespace as a temporary space for the first namespace NS1. The first storage device 120a may fail to store data corresponding to a write request for the third namespace NS3 in the ninth and tenth blocks BLK9 and BLK10 being the temporary space of the third namespace NS3. However, the first storage device 120a may store the data corresponding to the write request for the third namespace NS3 in an area of the third namespace NS3, which is not allocated to the temporary space.

As described above, the first storage device 120a may notify the host 110a of contents processed in the first storage device 120a. The first storage device 120a may provide pieces of information to the host 110a through an asynchronous event request. The pieces of information may include information about lack of an available space of the first namespace NS1 and information about allocation of a temporary space of the third namespace NS3. The information about lack of an available space of the first namespace NS1 may be information indicating that the available space of the first namespace NS1 is insufficient. The information about allocation of a temporary space of the third namespace NS3 may be information indicating that a free namespace is the third namespace NS3 and data of the first namespace NS1 to be received later are capable of being stored in the temporary space of the third namespace NS3, that is, the ninth and tenth blocks BLK9 and BLK10 of the third namespace NS3. How to transfer information will be more fully described with reference to FIG. 8.

Until the temporary space is deallocated, the host 110a may receive the above information and may recognize the following. Data corresponding to a write request for the first namespace NS1 may be stored in the ninth and tenth blocks BLK9 and BLK10 of the third namespace NS3 as a temporary space. Data corresponding to a write request for the third namespace NS3 may fail to be stored in the ninth and tenth blocks BLK9 and BLK10 of the third namespace NS3 as a temporary space. Thus, the host 110a may not perform a data write request for the third namespace NS3 to the ninth and tenth blocks BLK9 and BLK10 as the temporary space of the third namespace NS3. An available space of the third namespace NS3 may be reduced.

FIG. 6B is a diagram for describing how the first storage device 120a processes an additional data write request for the first namespace NS1 received from the host 110a.

Even though the first storage device 120a receives a write request for the first namespace NS1, an available space of the first namespace NS1 may be in a state of being insufficient. For example, data may be stored in all the first to tenth blocks BLK1 to BLK10 of the first namespace NS1. To solve the issue that an available space of the first namespace NS1 is insufficient, the first storage device 120a may store data corresponding to the write request for the first namespace NS1 in a temporary space of the third namespace NS3.

In an example embodiment, with regard to the write request for the first namespace NS1, the host 110a may transmit a write request including a namespace ID of the third namespace NS3 to the first storage device 120a. The write request may further include information indicating that the write request is a request for the first namespace NS1 (i.e., a namespace ID of the first namespace NS1). In response to the write request including the namespace ID of the third namespace NS3, the first storage device 120a may store data corresponding to the write request in the ninth and tenth blocks BLK9 and BLK10 of the third namespace NS3, which correspond to a temporary space.

In another example embodiment, the host 110a may transmit a write request including the namespace ID of the first namespace NS1 to the first storage device 120a. In response to the write request including the namespace ID of the first namespace NS1, the first storage device 120a may automatically redirect received data to the temporary space of the third namespace NS3. Thus, the first storage device 120a may store data associated with the first namespace NS1 in the ninth and tenth blocks BLK9 and BLK10 as the temporary space of the third namespace NS3.

In general, when a general storage system receives data, the size of which exceeds an available space of the first namespace NS1, in run-time, the general storage system processes the received data as a fail. In contrast, according to an example embodiment, even though an available space of the first namespace NS1 is insufficient, the first storage device 120a may allocate a temporary space of the free third namespace NS3. As such, in the case where the first storage device 120a receives data associated with the first namespace NS1, the first storage device 120a may store the received data in the temporary space of the third namespace NS3, thus securing the reliability and continuity of data corresponding to a write request.

FIG. 6C shows the storage system 100a to which a second storage device 140a is added.

After write-requested data, the size of which exceeds an available space of the first namespace NS1, are stored in the temporary space of the third namespace NS3 in run-time, the second storage device 140a may be added. The host 110a may communicate with the second storage device 140a through a second port PT2. The second storage device 140a may include a storage controller 150a. In an example embodiment, the storage controller 150a may be an NVMe controller. The second storage device 140a may include a fifth namespace NS5. The fifth namespace NS5 may include first to twentieth blocks BLK1 to BLK20.

Because the available space of the first namespace NS1 is insufficient, data stored in the first namespace NS1 may be flushed to the fifth namespace NS5 under control of the host 110a. Depending on a request of the host 110a, the first storage device 120a may read data stored in the first to tenth blocks BLK1 to BLK10 of the first namespace NS1 and data stored in the ninth and tenth blocks BLK9 and BLK10 as the temporary space of the third namespace NS3, and may write all the read data in the first to twelfth blocks BLK1 to BLK12 of the fifth namespace NS5.

When the flush operation is completed, the first storage device 120a may deallocate the temporary space of the third namespace NS3, which is allocated for the first namespace NS1. For example, the first storage device 120a may delete data being stored in the temporary space of the third namespace NS3, and may set the third namespace NS3 to a state capable of storing new data in the temporary space of the third namespace NS3. The first storage device 120a may notify the host 110a that the temporary space of the third namespace NS3 is completely deallocated. Afterward, in the case where the host 110a transmits a write request for the third namespace NS3, the first storage device 120a may store data corresponding to the write request in the ninth and tenth blocks BLK9 and BLK10 of the third namespace NS3, which are deallocated.

When all the data of the first namespace NS1 are flushed to the fifth namespace NS5, the first namespace NS1 may be replaced with the fifth namespace NS5. For example, when a write request for the first namespace NS1 is received, data corresponding to the write request may be stored in the fifth namespace NS5.

The host 110a may not require the first namespace NS1 any more. The host 110a may detach the first namespace NS1 from the first storage controller 130a of the first storage device 120a and may delete the first namespace NS1. For example, the host 110a may request a detach of the first namespace NS1 from the first storage device 120a through a namespace attachment command. The storage controller 130a of the first storage device 120a may detach the first namespace NS1 depending on the request of the host 110a. The host 110a may request a delete of the first namespace NS1 through a namespace management command. The storage controller 130a of the first storage device 120a may delete the first namespace NS1 depending on the request of the host 110a.

Accordingly, even though a storage system receives data, a size of which is larger than an available space of an allocated namespace in run-time, the storage system may temporally store the received data in a free namespace, and may flush the temporarily stored data, thus securing the continuity and reliability of data.

Figure 7A:
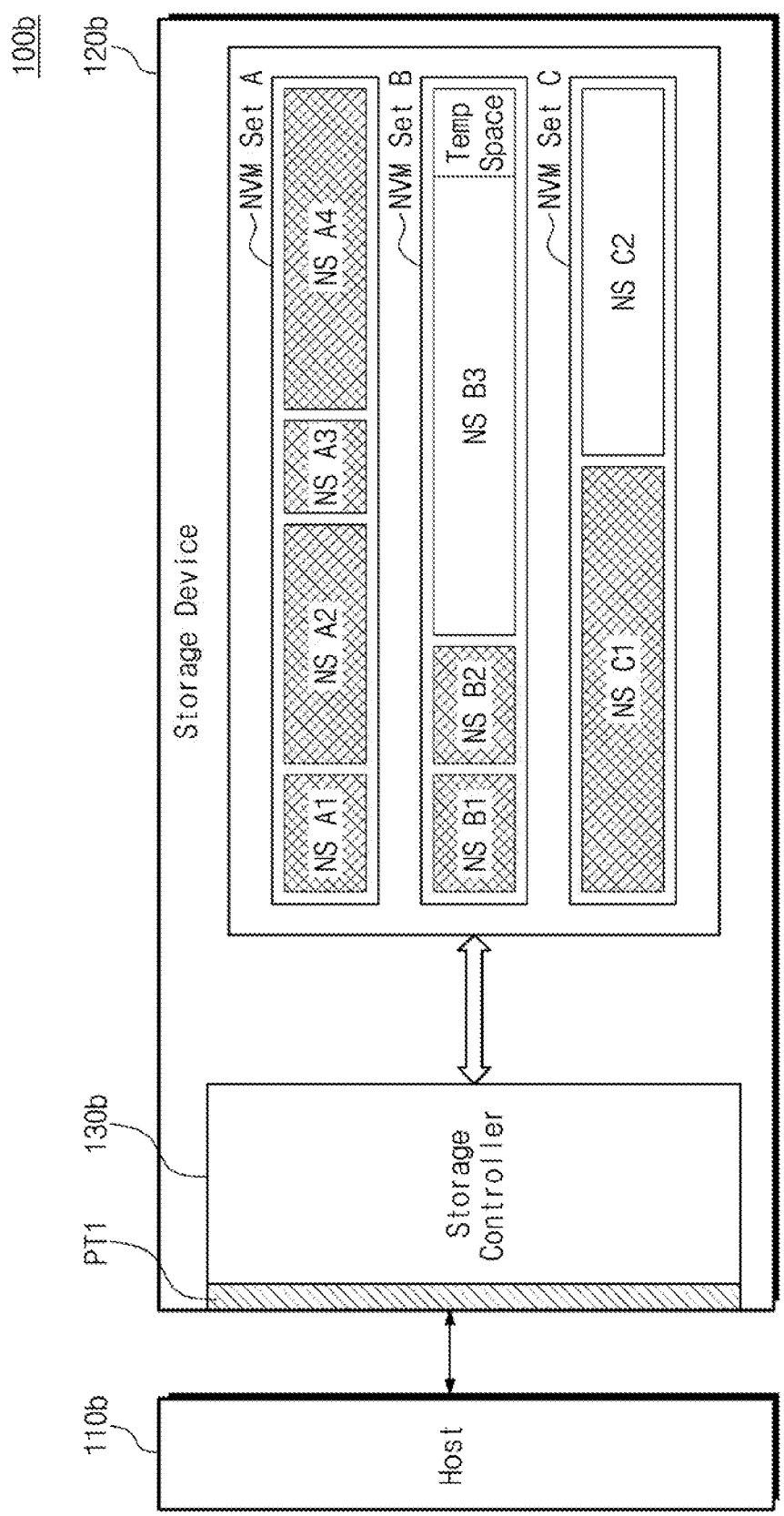
FIGS. 7A to 7C are diagrams illustrating an operation method of a storage device of FIG. 1.
Figure 7B:
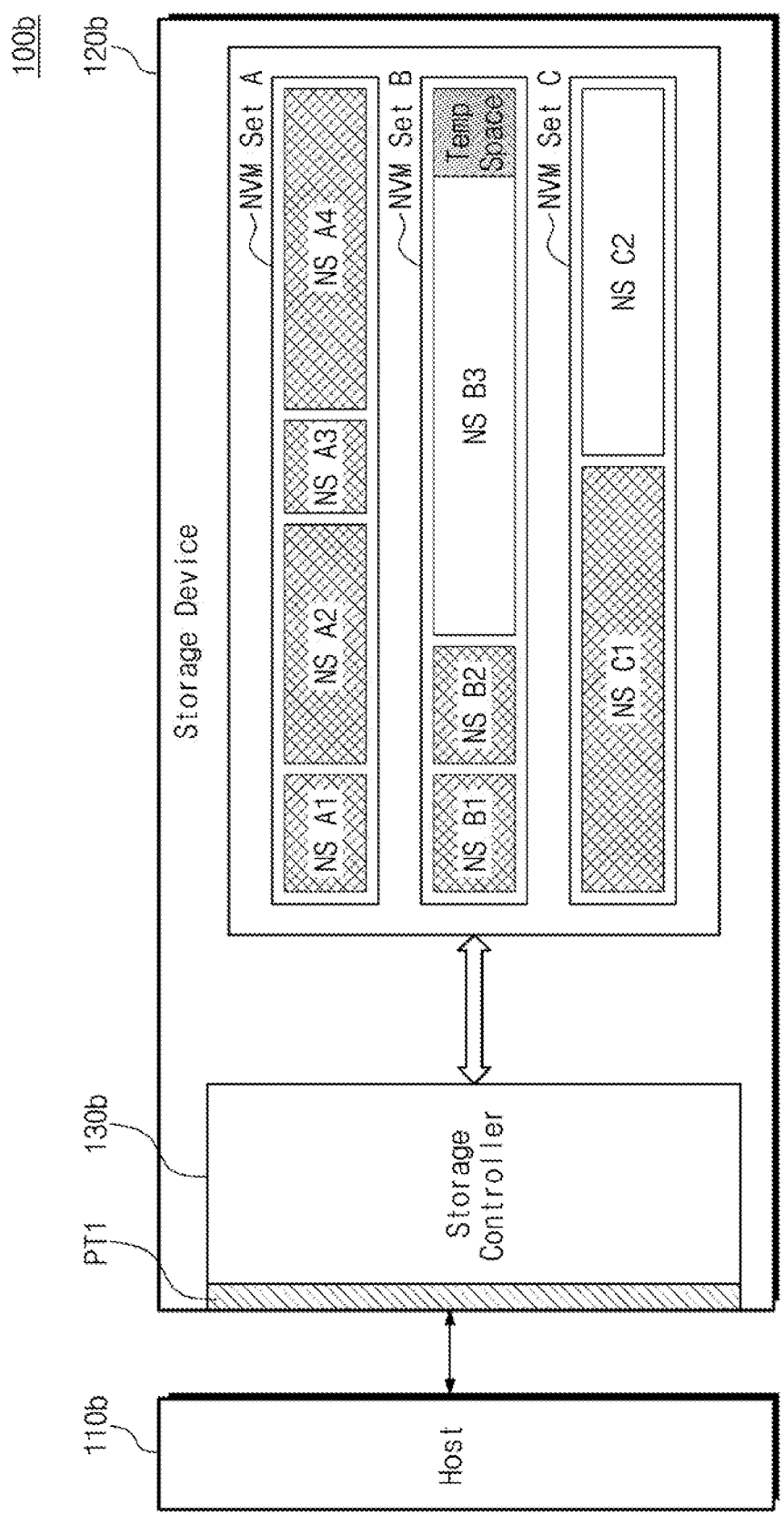
Figure 7C:
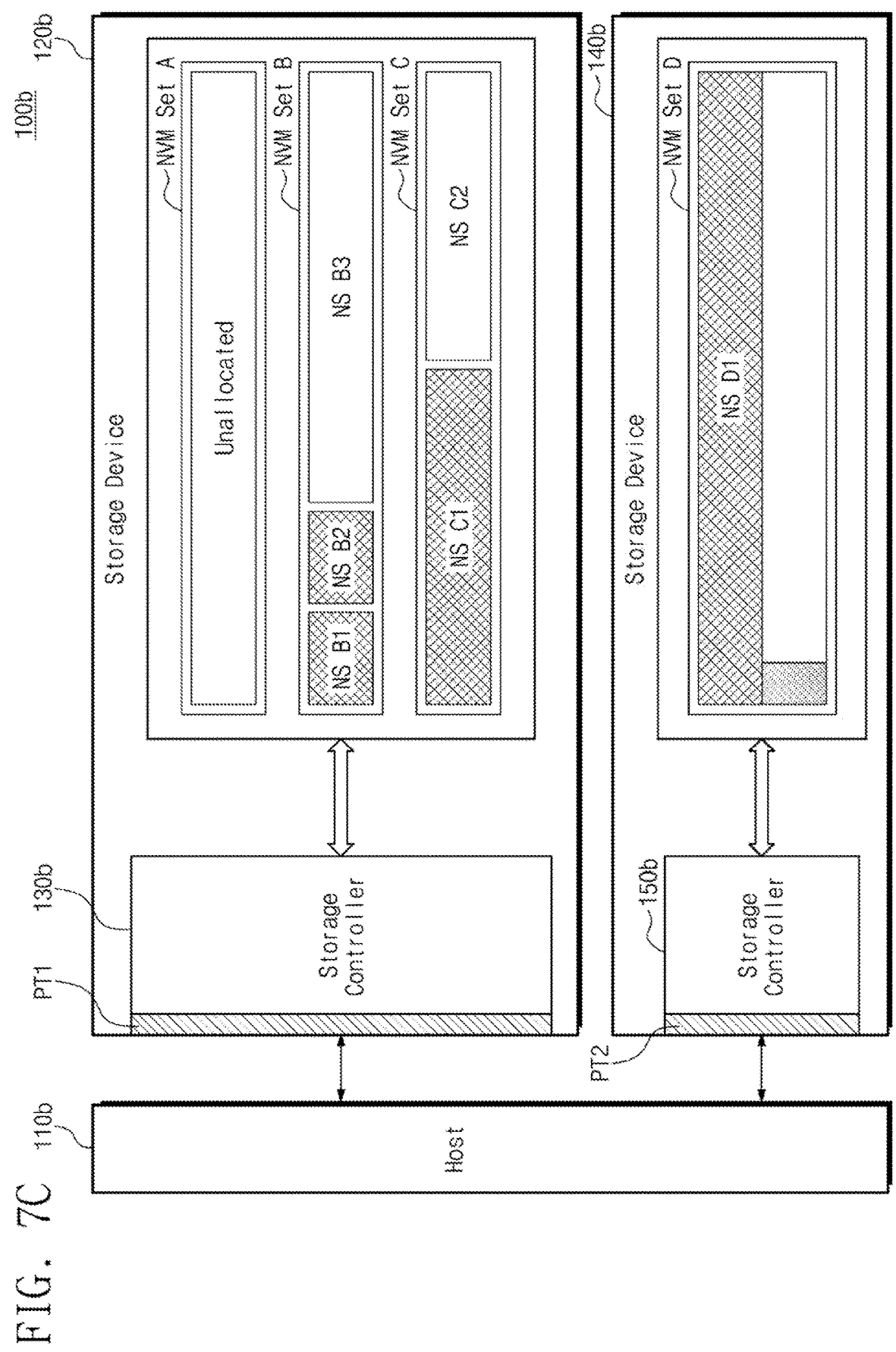

FIGS. 7A to 7C are diagrams illustrating an operation method of the storage device 120 of FIG. 1. Unlike FIGS. 6A to 6C where an available space of a namespace is insufficient, FIGS. 7A to 7C show a processing method of a first storage device 120b when an available space of a nonvolatile memory set is insufficient.

For brevity of illustration, components that are unnecessary to describe an operation of the first storage device 120b will be omitted.

Referring to FIG. 7A, a storage system 100b may include a host 110b and the first storage device 120b. The host 110b may communicate with the first storage device 120b through the first port PT1. The first storage device 120b may include a storage controller 130b. In an example embodiment, the storage controller 130b may be an NVMe controller.

The host 110b may divide a storage area of the first storage device 120b into A to C nonvolatile memory sets NVM Set A to NVM Set C, and may recognize the A to C nonvolatile memory sets NVM Set A to NVM Set C. The host 110b may control the divided nonvolatile memory sets NVM Set A to NVM Set C independently of each other. For example, the number of nonvolatile memory sets and a size of a nonvolatile memory set may be variously set according to an implementation of the host 110b or the first storage device 120b.

A nonvolatile memory set may include one or more namespaces. The A nonvolatile memory set NVM Set A may include A1 to A4 namespaces NS A1 to NS A4. The B nonvolatile memory set NVM Set B may include B1 to B3 namespaces NS B1 to NS B3. The C nonvolatile memory set NVM Set C may include C1 to C2 namespaces NS C1 to NS C2. In various example embodiments, the number of namespaces in a nonvolatile memory set and a size of each of the namespaces in the nonvolatile memory set may be variously set.

Data may be stored in the A1 to A4 namespaces NS A1 to NS A4 of the A nonvolatile memory set NVM Set A. Data may be stored in the B1 and B2 namespaces NS B1 and NS B2 of the B nonvolatile memory set NVM Set B. Data may be stored in the C1 namespace NS C1 of the C nonvolatile memory set NVM Set C.

In the case of receiving a write request for the A nonvolatile memory set NVM Set A, the first storage device 120b may determine whether an available space of the A nonvolatile memory set NVM Set A is insufficient. When the available space of the A nonvolatile memory set NVM Set A is equal to or less than a given reference, the first storage device 120b may determine that the available space of the A nonvolatile memory set NVM Set A is insufficient. In another implementation, when a size of data corresponding to a write request for the A nonvolatile memory set NVM Set A exceeds the available space of the A nonvolatile memory set NVM Set A, the first storage device 120b may determine that the available space of the A nonvolatile memory set NVM Set A is insufficient.

To store data additionally received with regard to the A nonvolatile memory set NVM Set A, the first storage device 120b may identify a free nonvolatile memory set. For example, the first storage device 120b may select a nonvolatile memory set having the lowest usage rate from among the nonvolatile memory sets NVM Set B and NVM Set C. For example, because the usage rate of the B nonvolatile memory set NVM Set B is the lowest, the first storage device 120b may select the B nonvolatile memory set NVM Set B as a free nonvolatile memory set.

The first storage device 120b may allocate a portion Temp space of an available space of the B3 namespace NS B3 of the B nonvolatile memory set NVM Set B to a temporary space. For example, under prediction that data associated with the A nonvolatile memory set NVM Set A are to be additionally received, the first storage device 120b may prepare a temporary space capable of storing the data to be additionally received. The first storage device 120b may provide the portion Temp space of a space of the B nonvolatile memory set NVM Set B (being a free nonvolatile memory set), in which data are not stored, as a temporary space for the A nonvolatile memory set NVM Set A. For the A nonvolatile memory set NVM Set A, the first storage device 120b may not store data corresponding to a write request for the B nonvolatile memory set NVM Set B in the portion Temp space of an available space of the B nonvolatile memory set NVM Set B, that is, the temporary space of the B nonvolatile memory set NVM Set B. However, the first storage device 120b may store the data corresponding to the write request for the B nonvolatile memory set NVM Set B in an area of the B nonvolatile memory set NVM Set B, which is not allocated to the temporary space.

As described above, the first storage device 120b may notify the host 110b of contents processed in the first storage device 120b. The first storage device 120b may provide pieces of information to the host 110b through an asynchronous event request. The pieces of information may include information about lack of an available space of the A nonvolatile memory set NVM Set A, and information about allocation of a temporary space of the B nonvolatile memory set NVM Set B. The information about lack of an available space of the A nonvolatile memory set NVM Set A may be information indicating that an available space of the A nonvolatile memory set NVM Set A is insufficient. The information about allocation of a temporary space of the B nonvolatile memory set NVM Set B may be information indicating that a free namespace is the B nonvolatile memory set NVM Set B and data to be received with respect to the A nonvolatile memory set NVM Set A later are capable of being stored in the portion Temp space of the B nonvolatile memory set NVM Set B. An example of how to transfer information will be more fully described with reference to FIG. 8.

Until the temporary space is deallocated, the host 110b may receive the above information and may recognize the following. Data corresponding to a write request for the A nonvolatile memory set NVM Set A may be stored in the portion Temp space of the B nonvolatile memory set NVM Set B, which corresponds to a temporary space. Data corresponding to a write request for the B nonvolatile memory set NVM Set B may not be stored in the portion Temp space of the B nonvolatile memory set NVM Set B, which corresponds to a temporary space. Thus, the host 110b may not request the first storage device 120b to write data associated with the B nonvolatile memory set NVM Set B in the portion Temp space of the B nonvolatile memory set NVM Set B, which corresponds to a temporary space. An available space of the B nonvolatile memory set NVM Set B may be reduced.

FIG. 7B is a diagram for describing an example of how the first storage device 120*b* processes an additional write request for the A nonvolatile memory set NVM Set A received from the host 110*b*.

When the first storage device 120*b* receives a write request for the A1 namespace NS A1 of the A nonvolatile memory set NVM Set A, an available space of the A nonvolatile memory set NVM Set A may be insufficient. To solve the issue that the available space of the A nonvolatile memory set NVM Set A is insufficient, the first storage device 120*b* may store data corresponding to the write request in a temporary space of the free B nonvolatile memory set NVM Set B.

In an example embodiment, with regard to the write request for the A1 namespace NS A1 of the A nonvolatile memory set NVM Set A, the host 110*b* may transmit a write request including a namespace ID of the B3 namespace NS B3 of the B nonvolatile memory set NVM Set B to the first storage device 120*b*. The write request may further include information indicating that the write request is a request for the A1 namespace NS A1 of the A nonvolatile memory set NVM Set A (i.e., a namespace ID of the A1 namespace NS A1 of the A nonvolatile memory set NVM Set A). In response to the write request including the namespace ID of the B3 namespace NS B3 of the B nonvolatile memory set NVM Set B, the first storage device 120*b* may store data corresponding to the write request in a portion Temp space of the B3 namespace NS B3 of the B nonvolatile memory set NVM Set B, that is, a temporary space.

In another example embodiment, the host 110*b* may transmit a write request including namespace ID of the A1 namespace NS A1 of the A nonvolatile memory set NVM Set A to the first storage device 120*b*. In response to the write request in which there is included the namespace ID of the A1 namespace NS A1 of the A nonvolatile memory set NVM Set A, the first storage device 120*b* may automatically redirect received data to the temporary space of the B nonvolatile memory set NVM Set B. Thus, the first storage device 120*b* may store data associated with the A nonvolatile memory set NVM Set A in the portion Temp space of the B3 namespace NS B3 of the B nonvolatile memory set NVM Set B.

FIG. 7C shows the storage system 100*b* to which a second storage device 140*b* is added.

After write-requested data, the size of which exceeds an available space of the A nonvolatile memory set NVM Set A, are stored in the temporary space of the B nonvolatile memory set NVM Set B in run-time, the second storage device 140*b* may be added. The host 110*b* may communicate with the second storage device 140*b* through the second port PT2. The second storage device 140*b* may include a storage controller 150*b*. In an example embodiment, the storage controller 150*b* may be an NVMe controller. The second storage device 140*b* may include a D nonvolatile memory set NVM Set D. The D nonvolatile memory set NVM Set D may include a D1 namespace NS D1.

Because an available space of the A nonvolatile memory set NVM Set A is insufficient, under control of the host 110*b*, data stored in the A nonvolatile memory set NVM Set A may be flushed to the D nonvolatile memory set NVM Set D. Depending on a request of the host 110*b*, the first storage device 120*b* may read data stored in the A nonvolatile memory set NVM Set A and data stored in the portion Temp space of the B nonvolatile memory set NVM Set B, that is, the temporary space, and may write all the read data in the D nonvolatile memory set NVM Set D.

When the flush operation is completed, the first storage device 120*b* may deallocate the temporary space of the B nonvolatile memory set NVM Set B, which is allocated for the A nonvolatile memory set NVM Set A. For example, the first storage device 120*b* may delete data being stored in the temporary space of the B nonvolatile memory set NVM Set B, and may set the B nonvolatile memory set NVM Set B to a state capable of storing new data in the temporary space of the B nonvolatile memory set NVM Set B. The first storage device 120*b* may notify the host 110*b* that the temporary space of the B3 namespace NS B3 is completely deallocated. Afterward, in the case where the host 110*b* transmits a write request for the B nonvolatile memory set NVM Set B, the first storage device 120*b* may store data corresponding to the write request in the deallocated space of the B nonvolatile memory set NVM Set B.

When all the data of the A nonvolatile memory set NVM Set A are flushed to the D nonvolatile memory set NVM Set D, the A nonvolatile memory set NVM Set A may be replaced with the D nonvolatile memory set NVM Set D. For example, when a write request for the A nonvolatile memory set NVM Set A is received, data corresponding to the write request may be stored in the D nonvolatile memory set NVM Set D.

The host 110*b* may not require the namespaces NS A1 to NS A4 of the A nonvolatile memory set NVM Set A any more. The host 110*b* may detach the namespaces NS A1 to NS A4 of the A nonvolatile memory set NVM Set A from the first storage controller 130*b* of the first storage device 120*b*, and may delete the namespaces NS A1 to NS A4. For example, the host 110*b* may request a detach of the namespaces NS A1 to NS A4 of the A nonvolatile memory set NVM Set A from the first storage device 120*b* through a namespace attachment command. The storage controller 130*b* of the first storage device 120*b* may detach the namespaces NS A1 to NS A4 of the A nonvolatile memory set NVM Set A depending on the request of the host 110*b*. The host 110*b* may request a delete of the namespaces NS A1 to NS A4 of the A nonvolatile memory set NVM Set A through a namespace management command. The storage controller 130*b* of the first storage device 120*b* may delete the namespaces NS A1 to NS A4 of the A nonvolatile memory set NVM Set A depending on the request of the host 110*b*.

When an available space of the A nonvolatile memory set NVM Set A is insufficient, the first storage device 120*b* according to an example embodiment may allocate a temporary space of the free B nonvolatile memory set NVM Set B. As such, in the case where the first storage device 120*b* receives data associated with the A nonvolatile memory set NVM Set A, the first storage device 120*b* may store the received data in the temporary space of the B nonvolatile memory set NVM Set B, thus securing the reliability and continuity of data corresponding to a write request.

Figure 8:
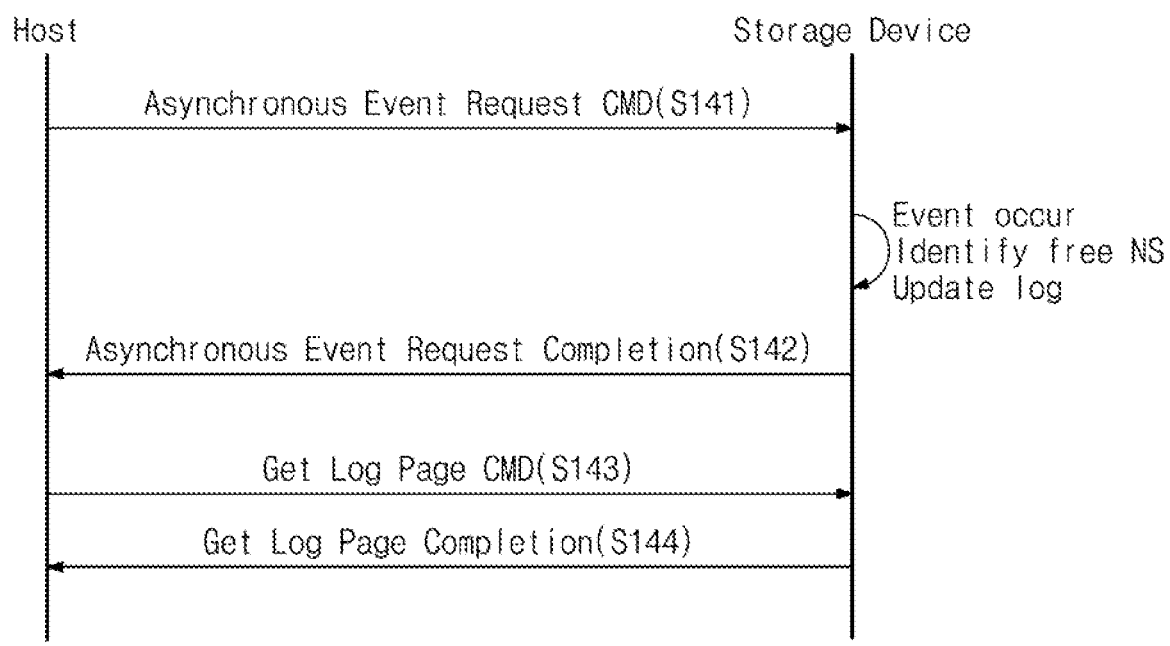
FIG. 8 is a flowchart illustrating operation S140 of FIG. 5 in detail.

FIG. 8 is a flowchart illustrating an example embodiment of operation S140 of FIG. 5 in detail.

Referring to FIGS. 1, 5, and 8, in operation S141, the host 110 may transmit an asynchronous event request command to the storage device 120. The asynchronous event request command may be a timeout-free command. In the case where the storage device 120 receives the asynchronous event request command, the storage device 120 may not transmit a completion immediately, but the storage device 120 may transmit a completion when an event occurs.

The storage device 120 may determine that a storage space of the A namespace NS A is insufficient, may identify a free namespace NS B, and may allocate a temporary space of the B namespace NS B being a free namespace. The storage device 120 may update a log by using event-related information. For example, the storage device 120 may update the log by using information about lack of an available space of the A namespace NS A and information about allocation of a temporary space of the B namespace NS B. Referring again to FIG. 2, the log may be stored in the RAM 132 of the storage controller 130 and/or the nonvolatile memory device NVM.

In operation S142, the storage device 120 may transmit an asynchronous event request completion for the purpose of notifying the host 110 that an event occurs. For example, the asynchronous event request completion may include a log identifier and event type information. The storage device 120 may read a log updated by the host 110 through the asynchronous event request completion. In another implementation, the storage device 120 may provide the host 110 with the asynchronous event request completion including the information about lack of an available space of the A namespace NS A and the information about allocation of a temporary space of the B namespace NS B. In this case, a "Get Log Page" procedure described below may not be performed.

In operation S143, the host 110 may transmit a "Get Log Page" command to the storage device 120. The "Get Log Page" command may include a log identifier, a log data size, a host memory address where log data read from the storage device 120 is to be stored, etc.

In operation S144, the storage device 120 may transmit a "Get Log Page" completion. When a size of the log data is small, the log data may be included in the "Get Log Page" completion. Thus, the "Get Log Page" completion may include the information about lack of an available space of the A namespace NS A and the information about allocation of a temporary space of the B namespace NS B. The storage device 120 may not transmit separate log data to the host 110. When the size of the log data is large, the storage device 120 may write the log data at the host memory address included in the "Get Log Page" command and may transmit the "Get Log Page" completion.

Figure 9:
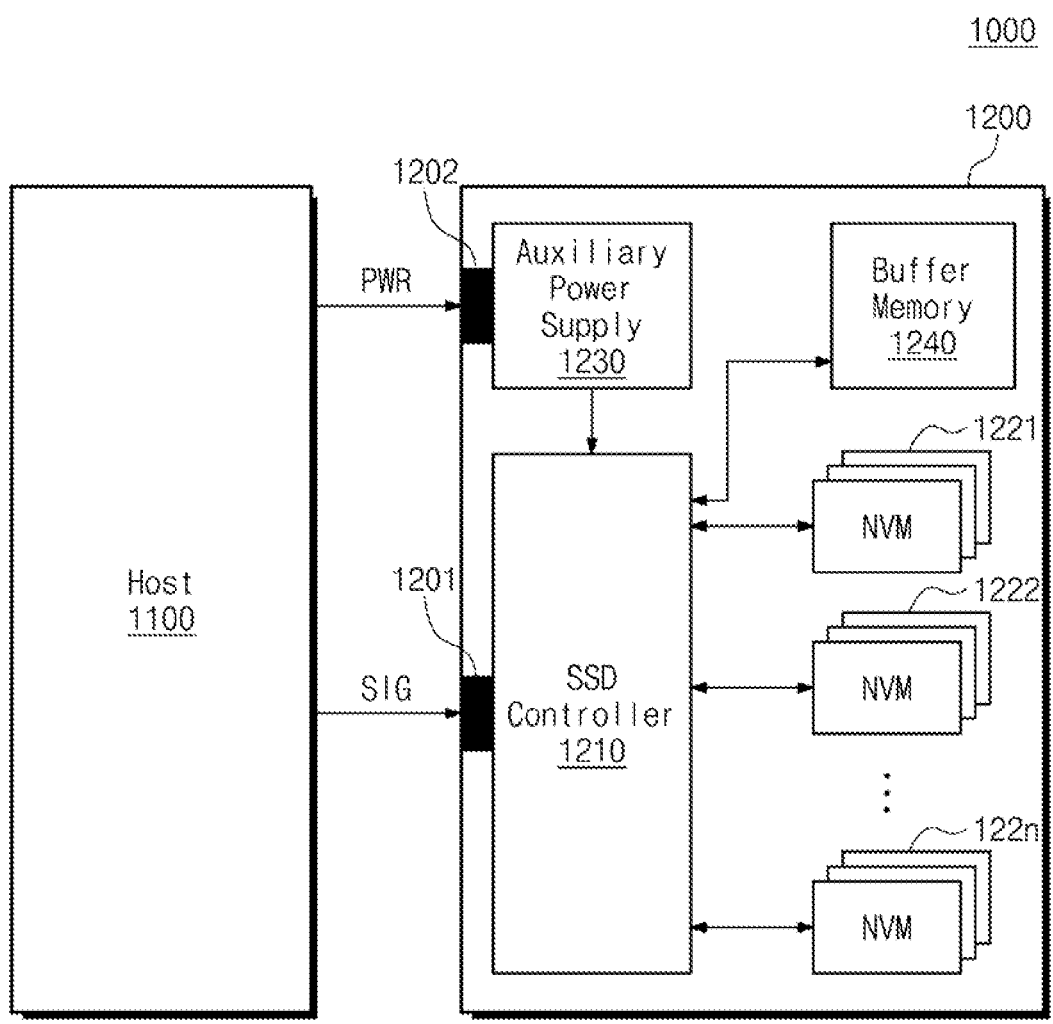
FIG. 9 is a block diagram illustrating a solid state drive system to which a storage system according to an example embodiment is applied.

FIG. 9 is a block diagram illustrating a solid state drive (SSD) system to which a storage system according to an example embodiment is applied.

Referring to FIG. 9, an SSD system 1000 may include a host 1100 and an SSD 1200.

The SSD 1200 may exchange signals SIG with the host 1100 through a signal connector 1201, and may be supplied with a power PWR through a power connector 1202. In an example embodiment, the signal connector 1201 may be a PCIe port, the signals SIG may be signals defined in the NVMe protocol, and the SSD 1200 may be an NVMe-based storage device. The SSD 1200 may include an SSD controller 1210, a plurality of flash memories 1221 to 122n, an auxiliary power supply 1230, and a buffer memory 1240. In an example embodiment, each of the plurality of flash memories 1221 to 122n may be implemented with a separate die or a separate chip.

The SSD controller 1210 may control the plurality of flash memories 1221 to 122n in response to the signals SIG received from the host 1100. In an example embodiment, the SSD controller 1210 may operate based on the operation method described with reference to FIGS. 1 to 8. The plurality of flash memories 1221 to 122n may operate under control of the SSD controller 1210.

The auxiliary power supply 1230 may be connected with the host 1100 through the power connector 1202. The auxiliary power supply 1230 may be charged by the power PWR supplied from the host 1100. When the power PWR is not smoothly supplied from the host 1100, the auxiliary power supply 1230 may power the SSD 1200.

Figure 10:
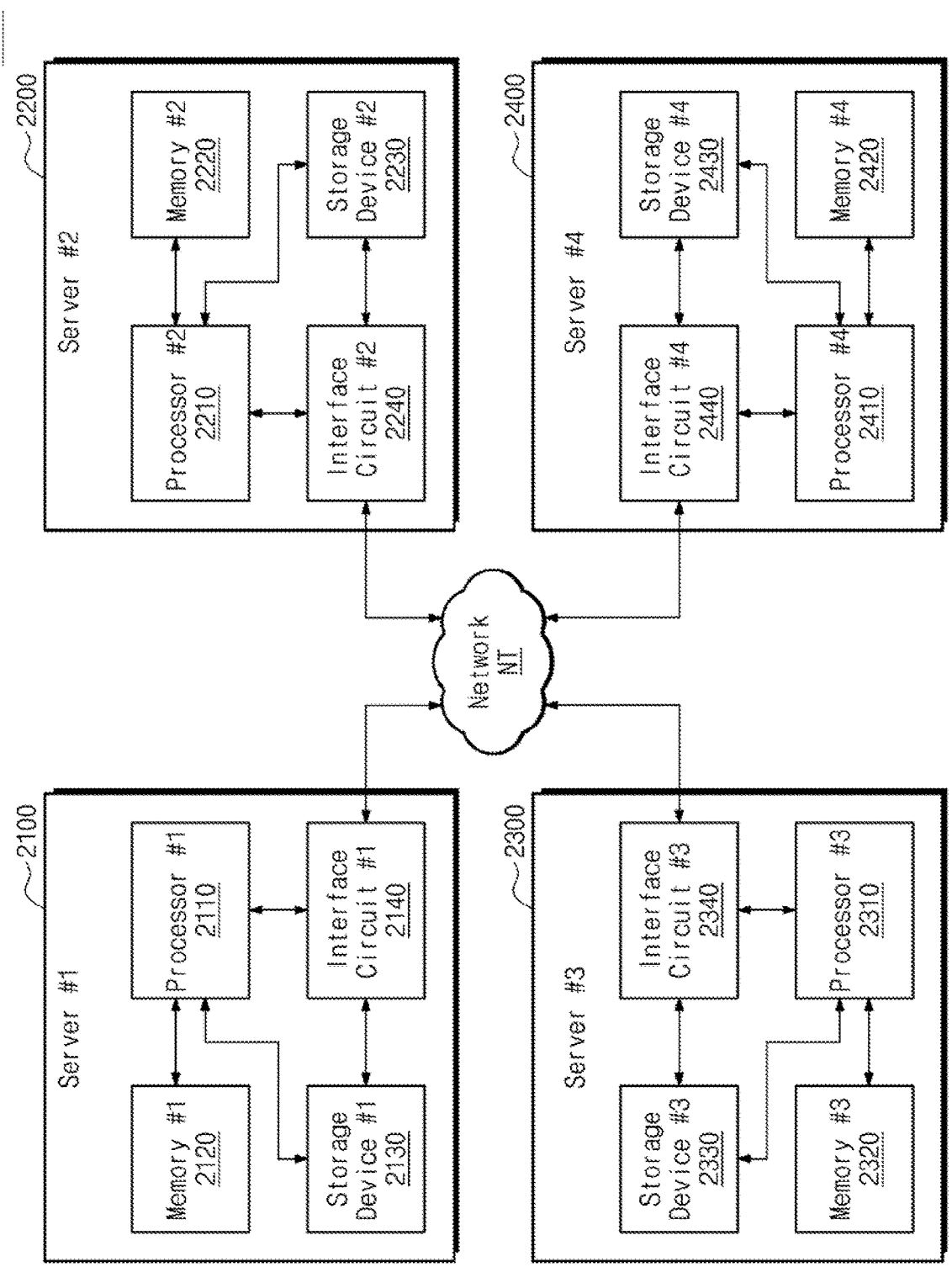
FIG. 10 is a block diagram illustrating a data center to which a storage system according to an example embodiment is applied.

FIG. 10 is a block diagram illustrating a data center to which a storage system according to an example embodiment is applied.

Referring to FIG. 10, a data center 2000 may include a plurality of computing nodes 2100 to 2400 (or servers). The plurality of computing nodes 2100 to 2400 may communicate with each other over a network NT. In an example embodiment, the network NT may be a storage dedicated network such as a storage area network (SAN) or may be an Internet network such as TCP/IP. In an example embodiment, the network NT may include at least one of various communication protocols such as Fibre channel, iSCSI protocol, FCoE, NAS, and NVMe-oF.

The plurality of computing nodes 2100 to 2400 may include processors 2110, 2210, 2310, and 2410, memories 2120, 2220, 2320, and 2420, storage devices 2130, 2230, 2330, and 2430, and interface circuits 2140, 2240, 2340, and 2440.

For example, the first computing node 2100 may include the first processor 2110, the first memory 2120, the first storage device 2130, and the first interface circuit 2140. In an example embodiment, the first processor 2110 may be implemented with a single core or a multi-core. The first memory 2120 may include a memory such as a DRAM, an SDRAM, an SRAM, a 3D XPoint memory, an MRAM, a PRAM, an FeRAM, or an ReRAM. The first memory 2120 may be used as a system memory, a working memory, or a buffer memory of the first computing node 2100. The first storage device 2130 may be a high-capacity storage medium such as a hard disk drive (HDD) or a solid state drive (SSD). The first interface circuit 2140 may be a network interface controller (NIC) configured to support communication over the network NT.

In an example embodiment, the first processor 2110 of the first computing node 2100 may be configured to access the first memory 2120 based on a given memory interface. In another example embodiment, in a shared memory architecture, the first processor 2110 of the first computing node 2100 may be configured to access the memories 2220, 2320, and 2420 of the remaining computing nodes 2200, 2300, and 2400 over the network NT. The interface circuit 2140 may include a network switch (not illustrated) configured to control or support an access of the first processor 2110 to a shared memory (i.e., memories of any other computing nodes).

In an example embodiment, the first processor 2110 of the first computing node 2100 may be configured to access the first storage device 2130 based on a given storage interface. In another implementation, the first processor 2110 of the first computing node 2100 may be configured to access the storage devices 2230, 2330, and 2430 of the remaining computing nodes 2200, 2300, and 2400 over the network NT. The interface circuit 2140 may include a network switch (not illustrated) configured to control or support an access of the first processor 2110 to any other storage devices. In an example embodiment, the storage devices 2130 to 2430 respectively included in the plurality of computing nodes 2100 to 2400 may constitute one RAID volume.

Operations of the second to fourth computing nodes 2200 to 2400 may be similar to the operation of the first computing node 2100 described above, and thus, additional description will be omitted to avoid redundancy.

In an example embodiment, various applications may be executed at the data center 2000. The applications may be configured to execute an instruction for data movement or copy between the computing nodes 2100 to 2400, or may be configured to execute instructions for combining, processing, or reproducing a variety of information present on the computing nodes 2100 to 2400. In an example embodiment, the applications may be executed by one of the plurality of computing nodes 2100 to 2400 included in the data center 2000, or the applications may be distributed and executed between the plurality of computing nodes 2100 to 2400.

In an example embodiment, the data center 2000 may be used for high-performance computing (HPC) (e.g., finance, petroleum, materials science, meteorological prediction), an enterprise application (e.g., scale out database), a big data application (e.g., NoSQL database or in-memory replication).

In an example embodiment, at least one of the plurality of computing nodes 2100 to 2400 may be an application server. The application server may be configured to execute an application configured to perform various operations at the data center 2000. At least one of the plurality of computing nodes 2100 to 2400 may be a storage server. The storage server may be configured to store data that are generated or managed at the data center 2000.

In an example embodiment, the plurality of computing nodes 2100 to 2400 included in the data center 2000 or portions thereof may be present at the same site or at sites physically separated from each other, and may communicate with each other over the wireless communication or wired communication based network NT. In an example embodiment, the plurality of computing nodes 2100 to 2400 included in the data center 2000 may be implemented by the same memory technology or may be implemented by different memory technologies.

Although not illustrated, at least a part of the plurality of computing nodes 2100 to 2400 of the data center 2000 may communicate with an external client node over the network NT or over any other communication interface. At least a part of the plurality of computing nodes 2100 to 2400 may automatically process a request (e.g., data store or data transfer) depending on a request of the external client node, or may process the request at any other computing node.

In an example embodiment, the number of computing nodes 2100 to 2400 included in the data center 2000 may be varied. Also, in each computing node, the number of processors, the number of memories, and the number of storage devices may be varied.

In an example embodiment, each of the plurality of computing nodes 2100 to 2400 may be the host described with reference to FIGS. 1 to 9, and each of the storage devices 2130 to 2430 respectively included in the plurality of computing nodes 2100 to 2400 may be the storage device described with reference to FIGS. 1 to 9. Even though each of the plurality of computing nodes 2100 to 2400 receive data, the size of which exceeds a capacity of an allocated namespace of each of the plurality of computing nodes 2100 to 2400, in run-time, each of the plurality of computing nodes 2100 to 2400 may store the received data in a temporary space of a free namespace such that a data loss does not occur, as described with reference to FIGS. 1 to 9.

According to an example embodiment, even if a user application receives data, the size of which exceeds a capacity of an allocated namespace, a data loss may not occur. Accordingly, an operation method of a storage device securing data continuity and reliability is provided.

By way of summation and review, in a data center to which a storage system using a nonvolatile memory device is applied, a user application may not predict the amount of payload to be received. If the amount of received data exceeds a capacity of a namespace, the user application may not solve this issue and, thus, over-provisioning of a data storage capacity may be implemented such that a total cost of ownership (TCO) to manage a data center increases.

As described above, embodiments may provide an operation method of a storage device preserving a continuity and reliability of data in a run-time scenario.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An operation method of a storage device, the method comprising:
   upon receiving, at the storage device, a write request for a first namespace among a plurality of namespaces that are logically divided and recognized by an external host device, determining, by the storage device, whether an available space of the first namespace is insufficient to fulfill the write request from the external host device; and
   responsive to determining that the available space of the first namespace is insufficient to fulfill the write request:
      reducing, by the storage device, a defined size of a second namespace, different from the first namespace, and allocating a portion of an available space of the second namespace to a temporary space for the first namespace,
      transmitting, from the storage device to the external host device, information about a lack of the available space of the first namespace and information about the allocation of the temporary space of the second namespace, and
      storing data corresponding to the write request for the first namespace in the temporary space of the second namespace.

2. The method as claimed in claim 1, wherein data stored in the first namespace and data stored in the temporary space of the second namespace are flushed to a third namespace of an external storage device under control of the external host device.

3. The method as claimed in claim 2, further comprising:
   when the flush is completed, deallocating the temporary space of the second namespace.

4. The method as claimed in claim 3, further comprising:
   when the temporary space is deallocated, transmitting information about the deallocation of the temporary space to the external host device.

5. The method as claimed in claim 1, wherein a case where the available space of the first namespace is insufficient includes at least one of:
  a case where the available space of the first namespace is equal to or less than a given reference; and
  a case where the available space of the first namespace is smaller than a size of the data corresponding to the write request.

6. The method as claimed in claim 1, wherein the second namespace is a namespace having a smallest usage rate from among the plurality of namespaces.

7. The method as claimed in claim 1, wherein the information about the lack of the available space of the first namespace and the information about the allocation of the temporary space of the second namespace are transmitted to the external host device through an asynchronous event request completion.

8. The method as claimed in claim 1, wherein the transmitting of the information about the lack of the available space of the first namespace and the information about the allocation of the temporary space of the second namespace includes:
  transmitting an asynchronous event request completion to the external host device;
  receiving a "Get Log Page" command from the external host device; and
  transmitting log data including the information about the lack of the available space of the first namespace and the information about the allocation of the temporary space of the second namespace and a "Get Log Page" completion to the external host device.

9. An operation method of a storage device, the method comprising:
  upon receiving, at the storage device, a write request for a first nonvolatile memory set among a plurality of nonvolatile memory sets that are logically divided and recognized by an external host device, determining, by the storage device, whether an available space of the first nonvolatile memory set is insufficient to fulfill the write request from the external host device; and
  responsive to determining that the available space of the first nonvolatile memory set is insufficient to fulfill the write request:
    reducing, by the storage device, a defined size of a second nonvolatile memory set, different from the first nonvolatile memory set, and allocating a portion of an available space of a second nonvolatile memory set to a temporary space for the first nonvolatile memory set,
    transmitting, from the storage device to the external host device, information about a lack of the available space of the first nonvolatile memory set and information about the allocation of the temporary space of the second nonvolatile memory set, and
    storing data corresponding to the write request for the first nonvolatile memory set in the temporary space of the second nonvolatile memory set.

10. The method as claimed in claim 9, wherein data stored in the first nonvolatile memory set and data stored in the temporary space of the second nonvolatile memory set are flushed to a third nonvolatile memory set of an external storage device under control of the external host device.

11. The method as claimed in claim 10, further comprising:
  when the flush is completed, deallocating the temporary space of the second nonvolatile memory set.

12. The method as claimed in claim 11, further comprising:
  when the temporary space is deallocated, transmitting information about the deallocation of the temporary space to the external host device.

13. The method as claimed in claim 9, wherein a case where the available space of the first nonvolatile memory set is insufficient includes at least one of:
  a case where the available space of the first nonvolatile memory set is equal to or less than a given reference; and
  a case where the available space of the first nonvolatile memory set is smaller than a size of the data corresponding to the write request.

14. The method as claimed in claim 9, wherein the second nonvolatile memory set is a nonvolatile memory set having a smallest usage rate from among the plurality of nonvolatile memory sets.

15. The method as claimed in claim 9, wherein each of the plurality of nonvolatile memory sets includes at least one nonvolatile memory device, or at least one namespace logically recognized by the external host device.

16. An operation method of a storage device, the method comprising:
  upon receiving, at the storage device, a write request for a first namespace among a plurality of namespaces that are logically divided and recognized by an external host device, determining, by the storage device, whether an available space of the first namespace is insufficient to fulfill the write request from the external host device; and
  responsive to determining that the available space of the first namespace is insufficient to fulfill the write request:
    reducing, by the storage device, a defined size of a second namespace, different from the first namespace, and allocating a portion of an available space of a second namespace to a temporary space for the first namespace, and
    storing data corresponding to the write request for the first namespace in the temporary space of the second namespace, wherein:
    data stored in the first namespace and data stored in the temporary space of the second namespace are flushed to a third namespace of an external storage device under control of the external host device.

17. The method as claimed in claim 16, further comprising:
  when the flush is completed, deallocating the temporary space of the second namespace.

18. The method as claimed in claim 17, further comprising:
  when the temporary space is deallocated, transmitting information about the deallocation of the temporary space to the external host device.

19. The method as claimed in claim 17, wherein information about the deallocation of the temporary space is transmitted to the external host device through an asynchronous event request completion.

20. The method as claimed in claim 16, wherein the information about the lack of the available space of the first namespace and the information about the allocation of the temporary space of the second namespace are transmitted to the external host device through an asynchronous event request completion.

* * * * *